US011160111B2

(12) United States Patent
Newman et al.

(10) Patent No.: US 11,160,111 B2
(45) Date of Patent: *Oct. 26, 2021

(54) MANAGED TRANSMISSION OF WIRELESS DAT MESSAGES

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 5G, LLC, Palos Verdes Estates, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,572

(22) Filed: Mar. 1, 2021

(65) Prior Publication Data

US 2021/0212119 A1 Jul. 8, 2021

Related U.S. Application Data

(63) Continuation of application No. 16/875,419, filed on May 15, 2020, now Pat. No. 10,939,471.

(Continued)

(51) Int. Cl.
*H04W 4/00* (2018.01)
*H04W 74/08* (2009.01)
(Continued)

(52) U.S. Cl.
CPC ....... *H04W 74/0816* (2013.01); *H04W 28/24* (2013.01); *H04W 72/0446* (2013.01);
(Continued)

(58) Field of Classification Search
CPC ............ H04W 74/0816; H04W 28/24; H04W 72/0446; H04W 72/082; H04W 88/08; H04W 92/20

(Continued)

(56) References Cited

U.S. PATENT DOCUMENTS 3,466,409 A 9/1969 Pernet
3,882,449 A 5/1975 Bouchard
(Continued)

FOREIGN PATENT DOCUMENTS

DE 102014212898 1/2016
EP 0136553 A2 4/1985
(Continued)

OTHER PUBLICATIONS

Hiraguri et al., Transmission Queueing Schemes for Improving Downlink Throughout on IEEE 802.11 WLANs, 2011.
"Automatic Post-Collision Braking System", Volkswagon, Retrieved from: http://www.volkswagen.co.uk/technology/braking-and-stability-systems/automatic-post-collision-braking-system Retrieved on: Oct. 31, 2016 (3 pages total).
(Continued)

*Primary Examiner* — Maharishi V Khirodhar
(74) *Attorney, Agent, or Firm* — Mayer & Williams PC

(57) ABSTRACT

Disclosed herein are systems and methods for enhancing wireless message throughput at high traffic density and high interference rates, by use of a managed message transmission protocol in which the base station instructs each node to transmit or retransmit a DAT message. For example, the base station may determine which node has experienced the most delays and may grant that node permission to transmit immediately, while instructing other nodes to wait their turn. Protocols can provide, under control of the base station, prompt mitigation and message completion after messages are corrupted by interference. The average delays, collision rate, and failure rate may be substantially reduced while the success rate and uniformity of access may be substantially improved. The managed transmission protocols can be
(Continued)

incorporated in current and planned systems by software updates at low cost, while retaining the ability to receive and process messages from legacy nodes transparently, according to some embodiments.

20 Claims, 12 Drawing Sheets

Related U.S. Application Data

(60) Provisional application No. 63/009,609, filed on Apr. 14, 2020, provisional application No. 62/861,055, filed on Jun. 13, 2019, provisional application No. 62/924,914, filed on Oct. 23, 2019, provisional application No. 62/947,812, filed on Dec. 13, 2019, provisional application No. 62/983,029, filed on Feb. 28, 2020, provisional application No. 63/009,609, filed on Apr. 14, 2020.

(51) Int. Cl.
 H04W 72/08 (2009.01)
 H04W 88/08 (2009.01)
 H04W 28/24 (2009.01)
 H04W 72/04 (2009.01)
 H04W 92/20 (2009.01)

(52) U.S. Cl.
 CPC ......... H04W 72/082 (2013.01); H04W 88/08 (2013.01); H04W 92/20 (2013.01)

(58) Field of Classification Search
 USPC .......................................................... 370/329
 See application file for complete search history.

(56) References Cited

U.S. PATENT DOCUMENTS

| | | | |
|---|---|---|---|
| 3,952,381 A | 4/1976 | Barbe | |
| 4,381,829 A | 5/1983 | Montaron | |
| 4,524,287 A | 6/1985 | Brannen | |
| 5,606,578 A | 2/1997 | O'Dea | |
| 5,860,136 A | 1/1999 | Fenner | |
| 5,861,036 A | 1/1999 | Godin | |
| 5,894,906 A | 4/1999 | Weber | |
| 5,959,552 A | 9/1999 | Cho | |
| 5,983,161 A | 11/1999 | Lemelson | |
| 6,084,508 A | 7/2000 | Mai | |
| 6,225,918 B1 | 5/2001 | Kam | |
| 6,269,308 B1 | 7/2001 | Kodaka | |
| 6,275,773 B1 | 8/2001 | Lemelson | |
| 6,317,692 B2 | 11/2001 | Kodaka | |
| 6,359,553 B1 | 3/2002 | Kopischke | |
| 6,420,996 B1 | 7/2002 | Stopczynski | |
| 6,442,485 B2 | 8/2002 | Evans | |
| 6,487,500 B2 | 11/2002 | Lemelson | |
| 6,496,764 B1 | 12/2002 | Wang | |
| 6,597,974 B2 | 7/2003 | Roelleke | |
| 6,678,590 B1 | 1/2004 | Burchfiel | |
| 6,691,227 B1 | 2/2004 | Neves | |
| 6,791,471 B2 | 9/2004 | Wehner | |
| 6,816,447 B1 | 11/2004 | Lee | |
| 6,831,572 B2 | 12/2004 | Strumolo | |
| 6,996,074 B2 | 2/2006 | Garcia-Luna-Aceves | |
| 7,002,947 B1 | 2/2006 | McFarland | |
| 7,016,782 B2 | 3/2006 | Schiffmann | |
| 7,079,508 B2 | 7/2006 | Ayyagari | |
| 7,124,027 B1 | 10/2006 | Ernst | |
| 7,177,294 B2 | 2/2007 | Chen | |
| 7,375,627 B2 | 5/2008 | Johnson | |
| 7,409,295 B2 | 8/2008 | Paradie | |
| 7,600,039 B2 | 10/2009 | Tang | |
| 7,660,436 B2 | 2/2010 | Chang | |
| 7,667,581 B2 | 2/2010 | Fujimoto | |
| 7,696,863 B2 | 4/2010 | Lucas | |
| 7,797,107 B2 | 9/2010 | Shiller | |
| 7,840,354 B2 | 11/2010 | Knoop | |
| 7,966,127 B2 | 6/2011 | Ono | |
| 7,975,798 B2 | 7/2011 | Lucas | |
| 8,108,147 B1 | 1/2012 | Blackburn | |
| 8,112,225 B2 | 2/2012 | Eidehall | |
| 8,238,378 B2 | 8/2012 | Benveniste | |
| 8,340,883 B2 | 12/2012 | Arbitmann | |
| 8,369,350 B2 | 2/2013 | Koo | |
| 8,447,472 B2 | 5/2013 | Joh | |
| 8,463,500 B2 | 6/2013 | Cuddihy | |
| 8,504,283 B2 | 8/2013 | Aso | |
| 8,520,695 B1 | 8/2013 | Rubin | |
| 8,527,172 B2 | 9/2013 | Moshchuk | |
| 8,538,674 B2 | 9/2013 | Breuer | |
| 8,576,055 B2 | 11/2013 | Hara | |
| 8,589,061 B2 | 11/2013 | Bengtsson | |
| 8,639,437 B2 | 1/2014 | Caminiti | |
| 8,849,515 B2 | 9/2014 | Moshchuk | |
| 8,874,300 B2 | 10/2014 | Allard | |
| 8,907,780 B2 | 12/2014 | Rohr | |
| 8,937,893 B1 | 1/2015 | Nemavat | |
| 8,948,955 B2 | 2/2015 | Zhu | |
| 9,031,743 B2 | 5/2015 | Okita | |
| 9,031,761 B2 | 5/2015 | Koshizen | |
| 9,031,774 B2 | 5/2015 | Suk | |
| 9,037,379 B2 | 5/2015 | Shin | |
| 9,050,930 B2 | 6/2015 | Walsh | |
| 9,108,582 B1 | 8/2015 | Kozloski | |
| 9,110,169 B2 | 8/2015 | Stettner | |
| 9,155,027 B1 | 10/2015 | Liu | |
| 9,165,469 B2 | 10/2015 | Bowers | |
| 9,199,614 B2 | 12/2015 | Ito | |
| 9,210,722 B2 | 12/2015 | Batsuuri | |
| 9,250,324 B2 | 2/2016 | Zeng | |
| 9,318,023 B2 | 4/2016 | Moshchuk | |
| 9,378,601 B2 | 6/2016 | Ricci | |
| 9,398,594 B2 | 7/2016 | Benveniste | |
| 9,415,658 B1 | 8/2016 | Makkar | |
| 9,421,400 B2 | 8/2016 | Oakes | |
| 9,469,297 B2 | 10/2016 | Akiyama | |
| 9,701,307 B1 | 7/2017 | Newman | |
| 9,721,400 B1 | 8/2017 | Oakes, III | |
| 9,729,299 B2 | 8/2017 | Barriac | |
| 9,788,182 B2 | 10/2017 | Lee | |
| 9,896,093 B2 | 2/2018 | Vollmer | |
| 9,896,096 B2 | 2/2018 | Newman | |
| 9,979,643 B2 | 5/2018 | Tosaka | |
| 10,335,962 B1 | 7/2019 | Rosenberg | |
| 10,405,340 B2 | 9/2019 | Ma | |
| 10,489,303 B2 | 11/2019 | Swaine | |
| 10,499,302 B1* | 12/2019 | McLennan | H04B 17/318 |
| 10,939,471 B2* | 3/2021 | Newman | H04W 92/20 |
| 2002/0037014 A1 | 3/2002 | Myojo | |
| 2002/0198632 A1 | 12/2002 | Breed | |
| 2003/0014165 A1 | 1/2003 | Baker | |
| 2003/0067219 A1 | 4/2003 | Seto | |
| 2003/0080543 A1 | 5/2003 | Takagi | |
| 2003/0114113 A1 | 6/2003 | Kornprobst | |
| 2003/0193889 A1 | 10/2003 | Jacobsen | |
| 2004/0030498 A1 | 2/2004 | Knoop | |
| 2004/0100936 A1 | 5/2004 | Liu | |
| 2004/0117081 A1 | 6/2004 | Mori | |
| 2004/0120292 A1 | 6/2004 | Trainin | |
| 2004/0122578 A1 | 6/2004 | Isaji | |
| 2004/0193374 A1 | 9/2004 | Hae | |
| 2004/0252863 A1 | 12/2004 | Chang | |
| 2005/0058151 A1 | 3/2005 | Yeh | |
| 2005/0060069 A1 | 3/2005 | Breed | |
| 2005/0071071 A1 | 3/2005 | Nagata | |
| 2005/0107955 A1 | 5/2005 | Isaji | |
| 2005/0114000 A1 | 5/2005 | Cashier | |
| 2005/0131646 A1 | 6/2005 | Camus | |
| 2005/0206142 A1 | 9/2005 | Prakah-Asante | |
| 2005/0280520 A1 | 12/2005 | Kubo | |
| 2006/0028984 A1 | 2/2006 | Wu | |
| 2006/0029073 A1 | 2/2006 | Cervello | |

(56) References Cited

U.S. PATENT DOCUMENTS

| | | |
|---|---|---|
| 2006/0050661 A1 | 3/2006 | Shim |
| 2006/0085131 A1 | 4/2006 | Yopp |
| 2006/0091654 A1 | 5/2006 | De Mersseman |
| 2006/0109094 A1 | 5/2006 | Prakah-Asante |
| 2006/0125616 A1 | 6/2006 | Song |
| 2006/0227802 A1 | 10/2006 | Du |
| 2006/0268878 A1 | 11/2006 | Jung |
| 2006/0282218 A1 | 12/2006 | Urai |
| 2007/0078600 A1 | 4/2007 | Fregene |
| 2007/0080825 A1 | 4/2007 | Shiller |
| 2007/0112516 A1 | 5/2007 | Taniguchi |
| 2007/0125588 A1 | 6/2007 | Akgun |
| 2007/0159319 A1 | 7/2007 | Maldonado |
| 2007/0189239 A1 | 8/2007 | Lim |
| 2007/0219672 A1 | 9/2007 | Fehr |
| 2007/0282530 A1 | 12/2007 | Meister |
| 2007/0297353 A1* | 12/2007 | Habetha ............... H04L 1/1607 370/310 |
| 2008/0097699 A1 | 4/2008 | Ono |
| 2008/0208408 A1 | 8/2008 | Arbitmann |
| 2008/0300755 A1 | 12/2008 | Madau |
| 2008/0319610 A1 | 12/2008 | Oechsle |
| 2009/0018740 A1 | 1/2009 | Noda |
| 2009/0066492 A1 | 3/2009 | Kubota |
| 2009/0074249 A1 | 3/2009 | Moed |
| 2009/0076702 A1 | 3/2009 | Arbitmann |
| 2009/0143951 A1 | 6/2009 | Takahashi |
| 2009/0157247 A1 | 6/2009 | Sjogren |
| 2009/0182465 A1 | 7/2009 | Wilke |
| 2009/0184862 A1 | 7/2009 | Stayton |
| 2009/0192683 A1 | 7/2009 | Kondou |
| 2009/0292468 A1 | 11/2009 | Wu |
| 2009/0299593 A1 | 12/2009 | Borchers |
| 2009/0299857 A1 | 12/2009 | Brubaker |
| 2009/0322500 A1 | 12/2009 | Chatterjee |
| 2009/0326796 A1 | 12/2009 | Prokhorov |
| 2010/0110888 A1 | 5/2010 | Park |
| 2010/0131635 A1 | 5/2010 | Gunduzhan |
| 2010/0150074 A1 | 6/2010 | Yamada |
| 2010/0179760 A1 | 7/2010 | Petrini |
| 2010/0191759 A1 | 7/2010 | Li |
| 2010/0256852 A1 | 10/2010 | Mudalige |
| 2010/0305857 A1 | 12/2010 | Byrne |
| 2011/0035116 A1 | 2/2011 | Ieda |
| 2011/0106361 A1 | 5/2011 | Staempfle |
| 2011/0149881 A1* | 6/2011 | Gong ................... H04B 7/0452 370/329 |
| 2011/0178710 A1 | 7/2011 | Pilutti |
| 2011/0210872 A1 | 9/2011 | Molander |
| 2011/0238987 A1 | 9/2011 | Kherani |
| 2011/0295464 A1 | 12/2011 | Zagorski |
| 2011/0307139 A1 | 12/2011 | Caminiti |
| 2012/0078472 A1 | 3/2012 | Neal |
| 2012/0083947 A1 | 4/2012 | Anderson |
| 2012/0083960 A1 | 4/2012 | Zhu |
| 2012/0092208 A1 | 4/2012 | Le Mire |
| 2012/0101713 A1 | 4/2012 | Moshchuk |
| 2012/0130561 A1 | 5/2012 | Chiang |
| 2012/0130629 A1 | 5/2012 | Kim |
| 2012/0143488 A1 | 6/2012 | Othmezouri |
| 2012/0155397 A1 | 6/2012 | Shaffer |
| 2012/0230205 A1 | 9/2012 | An |
| 2012/0230262 A1 | 9/2012 | Benveniste |
| 2012/0235853 A1 | 9/2012 | Takeuchi |
| 2012/0330542 A1 | 12/2012 | Hafner |
| 2013/0003661 A1 | 1/2013 | Matsuo |
| 2013/0030651 A1 | 1/2013 | Moshchuk |
| 2013/0030686 A1 | 1/2013 | Morotomi |
| 2013/0054128 A1 | 2/2013 | Moshchuk |
| 2013/0136013 A1* | 5/2013 | Kneckt ............. H04W 74/0816 370/252 |
| 2013/0162479 A1 | 6/2013 | Kelly |
| 2013/0166150 A1 | 6/2013 | Han |
| 2013/0279392 A1 | 10/2013 | Rubin |
| 2013/0279393 A1 | 10/2013 | Rubin |
| 2013/0279491 A1 | 10/2013 | Rubin |
| 2013/0336113 A1 | 12/2013 | Okuyama |
| 2014/0016475 A1 | 1/2014 | Zhou |
| 2014/0032049 A1 | 1/2014 | Moshchuk |
| 2014/0039786 A1 | 2/2014 | Schleicher |
| 2014/0049646 A1 | 2/2014 | Nix |
| 2014/0070980 A1 | 3/2014 | Park |
| 2014/0087749 A1 | 3/2014 | Mar |
| 2014/0139366 A1 | 5/2014 | Moses |
| 2014/0142798 A1 | 5/2014 | Guarnizo |
| 2014/0156157 A1 | 6/2014 | Johnson |
| 2014/0207344 A1 | 7/2014 | Ihlenburg |
| 2014/0269383 A1 | 9/2014 | He |
| 2014/0307658 A1 | 10/2014 | Vedantham |
| 2014/0379167 A1 | 12/2014 | Flehmig |
| 2015/0003251 A1 | 1/2015 | Shaffer |
| 2015/0046078 A1 | 2/2015 | Biess |
| 2015/0085119 A1 | 3/2015 | Dagan |
| 2015/0160338 A1 | 6/2015 | Bageshwar |
| 2015/0166062 A1 | 6/2015 | Johnson |
| 2015/0172012 A1 | 6/2015 | Abeysekera |
| 2015/0201413 A1* | 7/2015 | Seo .................... H04W 74/0816 370/336 |
| 2015/0239413 A1 | 8/2015 | Kozloski |
| 2015/0249515 A1 | 9/2015 | Wu |
| 2015/0262487 A1 | 9/2015 | Cazanas |
| 2015/0264538 A1 | 9/2015 | Klang |
| 2015/0271137 A1 | 9/2015 | Seok |
| 2015/0289164 A1 | 10/2015 | Seok |
| 2015/0307097 A1 | 10/2015 | Steinmeyer |
| 2015/0336574 A1 | 11/2015 | Akiyama |
| 2015/0336579 A1 | 11/2015 | Yoshizawa |
| 2015/0340763 A1 | 11/2015 | Stepanenko |
| 2016/0035155 A1 | 2/2016 | Rice |
| 2016/0044693 A1 | 2/2016 | Sun |
| 2016/0050686 A1 | 2/2016 | Krishnamoorthi |
| 2016/0071417 A1 | 3/2016 | Lewis |
| 2016/0095139 A1* | 3/2016 | Ding .................... H04W 28/26 370/329 |
| 2016/0103218 A1 | 4/2016 | Mandava |
| 2016/0107609 A1 | 4/2016 | Sogabe |
| 2016/0112999 A1 | 4/2016 | Kosaka |
| 2016/0121887 A1 | 5/2016 | Jeon |
| 2016/0125746 A1 | 5/2016 | Kunzi |
| 2016/0163199 A1 | 6/2016 | Chundrlik |
| 2016/0167671 A1 | 6/2016 | Offenhaeuser |
| 2016/0198493 A1 | 7/2016 | Lin |
| 2016/0200318 A1 | 7/2016 | Parikh |
| 2016/0200319 A1 | 7/2016 | Nemoto |
| 2016/0200320 A1 | 7/2016 | Nemoto |
| 2016/0200321 A1 | 7/2016 | Yamada |
| 2016/0203719 A1 | 7/2016 | Divekar |
| 2016/0236638 A1 | 8/2016 | Lavie |
| 2016/0239921 A1 | 8/2016 | Bray |
| 2016/0254691 A1 | 9/2016 | Koo |
| 2016/0255530 A1 | 9/2016 | Li |
| 2016/0288799 A1 | 10/2016 | Nguyen Van |
| 2016/0345362 A1 | 11/2016 | Lee |
| 2017/0019933 A1 | 1/2017 | Zhao |
| 2017/0043768 A1 | 2/2017 | Prokhorov |
| 2017/0055294 A1 | 2/2017 | Lee |
| 2017/0127433 A1 | 5/2017 | Lin |
| 2017/0144391 A1 | 5/2017 | Kim |
| 2017/0148235 A1 | 5/2017 | Yakub |
| 2017/0164371 A1 | 6/2017 | Kim |
| 2017/0188352 A1 | 6/2017 | Lee |
| 2017/0236340 A1 | 8/2017 | Hagan, Jr. |
| 2017/0325214 A1 | 11/2017 | Lu |
| 2017/0330457 A1 | 11/2017 | Bhalia |
| 2017/0337813 A1 | 11/2017 | Taylor |
| 2018/0054841 A1 | 2/2018 | Li |
| 2018/0077726 A1* | 3/2018 | Boger ................. H04W 74/002 |
| 2018/0109976 A1 | 4/2018 | Ly |
| 2018/0113476 A1 | 4/2018 | Giles |
| 2018/0123839 A1 | 5/2018 | Chung |
| 2018/0337846 A1 | 11/2018 | Lee |
| 2019/0008345 A1 | 1/2019 | Schmidt |
| 2019/0025842 A1 | 1/2019 | Kim |
| 2019/0158257 A1 | 5/2019 | Sano |

(56) References Cited

U.S. PATENT DOCUMENTS

| | | |
|---|---|---|
| 2019/0173726 A1 | 6/2019 | Wong |
| 2019/0188997 A1 | 6/2019 | Gilson |
| 2019/0191376 A1* | 6/2019 | Kim .................. H04W 52/0229 |
| 2019/0191464 A1 | 6/2019 | Loehr |
| 2019/0200404 A1 | 6/2019 | Yu |
| 2019/0239040 A1 | 8/2019 | Va |
| 2020/0383030 A1 | 12/2020 | Cho |
| 2021/0064996 A1 | 3/2021 | Wang |
| 2021/0135733 A1 | 5/2021 | Huang |
| 2021/0185700 A1 | 6/2021 | Pezeshki |
| 2021/0195457 A1 | 6/2021 | Kim |
| 2021/0195629 A1 | 6/2021 | Chauvin |
| 2021/0235302 A1 | 7/2021 | Chande |

FOREIGN PATENT DOCUMENTS

| | | |
|---|---|---|
| KR | 1020110125671 | 11/2011 |
| WO | 2006106459 | 10/2006 |
| WO | 2015070087 | 5/2015 |

OTHER PUBLICATIONS

"Emergency", OnStar, Retrieved from: https://www.onstar.com/us/en/services/emergency.html Retrieved on: Nov. 9, 2016 (4 pages total).

Emison, J. Kent, "Post-collision fuel-fed fires.", Apr. 1, 2995, The Free Library, Retrieved Nov. 9, 2016, Retrieved from: https://www.thefreelibrary.com/Post-collision+fuel-fed+fires.-a016859548 (5 pages).

Rodrigo Garces, Collision Avoidance and Resolution Multiple Access for Multichannel Wireless Networks, 1997, https://www.researchgate.net/profile/Jj_Garcia-Luna-Aceves/publication/226494020_Collision_avoidance_and_resolution_multiple_access_CARMA/links/02e7e5334f4dc13f6b000000/Collision-avoidance-and-resolution-multiple-access-CARMA.pdf.

Wei Ye, An Energy-Efficient MAC Protocol for Wireless Sensor Networks, 2002, https://www.isi.edy/~johnh/PAPERS/Ye02a.pdf.

Jung Il Choi, Granting Silence to Avoid Wireless Collisions, 2010, https://sing.stanford,edu/pubs/icnp10-gts.pdf.

James M. Westall, Csma/Ca, 2016, https://people.cs.clemson.edu/~westall/851/802.11/802_CSMA_CA.pdf.

* cited by examiner

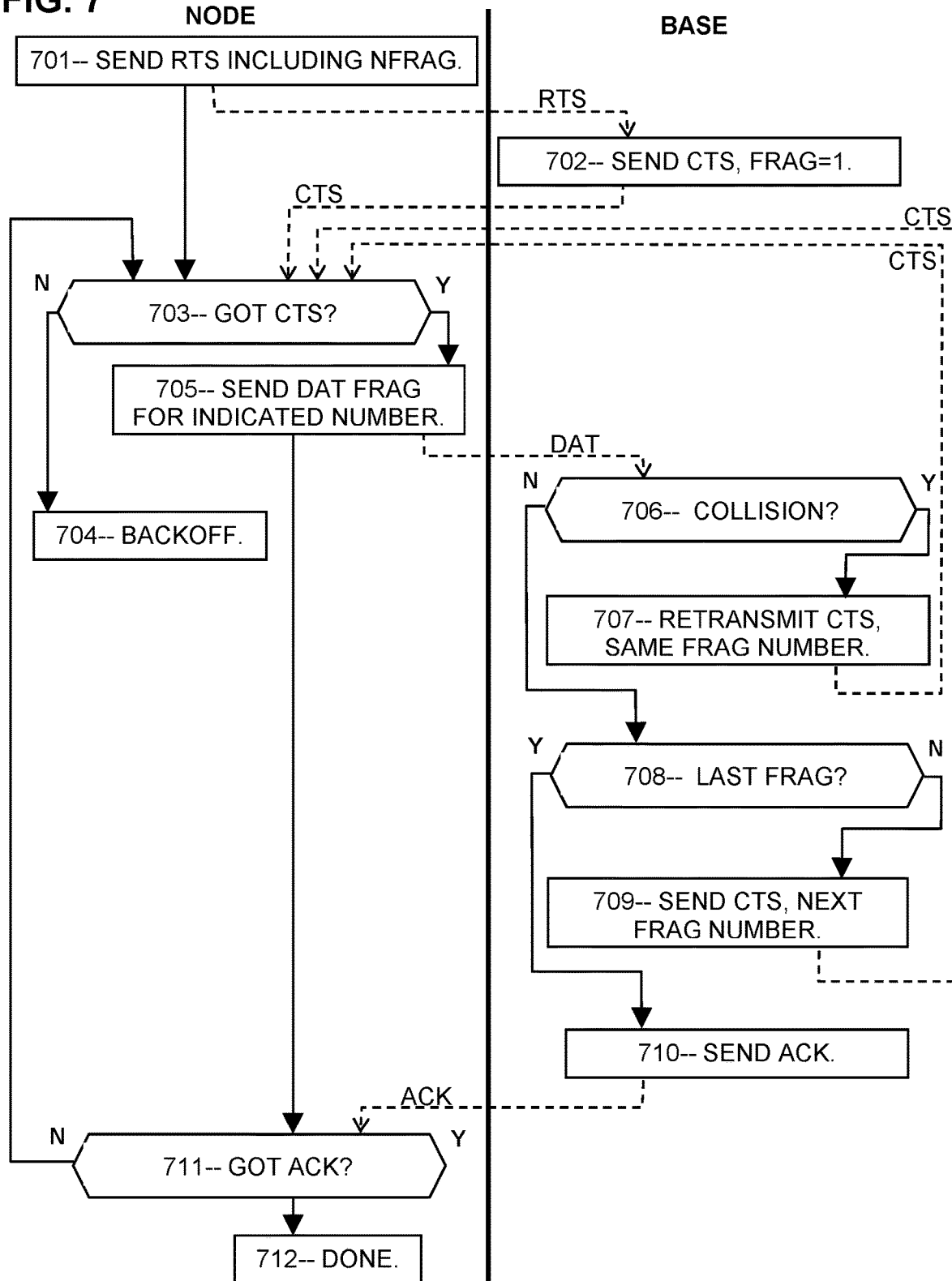

MANAGED TRANSMISSION OF WIRELESS DAT MESSAGES

PRIORITY CLAIMS AND RELATED APPLICATIONS

This application is a continuation of U.S. patent application Ser. No. 16/875,419, entitled "Managed Transmission of Wireless DAT Messages", filed on May 15, 2020, which claims the benefit of U.S. Provisional Patent Application Ser. No. 62/843,867, entitled "Identification and Localization of Mobile Robots", filed May 6, 2019, and U.S. Provisional Patent Application No. 62/861,055, entitled "Rapid Wireless Communication for Vehicle Collision Mitigation", filed Jun. 13, 2019, and U.S. Provisional Patent Application No. 62/924,914, entitled "Wireless Protocol for Improved Throughput and Fairness", filed Oct. 23, 2019, and U.S. Provisional Patent Application No. 62/947,812, entitled "Short Pre-RTS Packets for Wireless Collision Avoidance", filed Dec. 13, 2019, and U.S. Provisional Patent Application No. 62/983,029, entitled "Short RTS Messages for Rapid Wireless Communication", filed Feb. 28, 2020, and U.S. Provisional Patent Application No. 63/009,609, entitled "Managed Transmission of Wireless DAT Messages", filed Apr. 14, 2020, and U.S. Provisional Patent Application No. 63/023,462, filed May 12, 2020, all of which are hereby incorporated by reference in their entireties. This application is also related to U.S. Pat. No. 9,896,096, issued Feb. 20, 2018, entitled "Systems and Methods for Hazard Mitigation" and U.S. patent application Ser. No. 16/148,390, filed Oct. 1, 2018, entitled "Blind Spot Potential-Hazard Avoidance System", and U.S. patent application Ser. No. 16/503,020, filed Jul. 3, 2019, entitled "Rapid Wireless Communication for Vehicle Collision Mitigation", U.S. patent application Ser. No. 16/422,498, filed Oct. 17, 2019, entitled "Identification and Localization of Mobile Robots", and U.S. patent application Ser. No. 16/698,011, filed Nov. 13, 2019, entitled "Wireless Message Collision Avoidance with High Throughput", and U.S. patent application Ser. No. 16/723,198, filed Dec. 20, 2019, entitled "Short Pre-RTS Packets for Wireless Collision Avoidance", and U.S. patent application Ser. No. 16/819,546, filed Mar. 16, 2020, entitled "Short RTS Messages for Rapid Wireless Communication", the contents of which are incorporated herein by reference in their entireties.

FIELD OF THE INVENTION

The invention relates to systems and methods for managing network communications, and particularly to providing means for controlling the transmission and timing of data (DAT) messages.

BACKGROUND OF THE INVENTION

Wireless networking is expanding exponentially as more and diverse applications rapidly acquire the ability to communicate by radio waves. In addition, with the development of 5G technologies, the number of transmitters is expected to increase dramatically, resulting in interference and congestion as messages overlap or are forced to delay. For example, in a "collision" between two wireless messages on the same frequency channel, both messages are rendered unintelligible, and both of the transmitting devices are obligated to delay for a randomly selected time before again attempting to communicate. The resulting delays and retransmissions thereby suppress throughput and can result in some messages being dropped entirely.

What is needed is means for enhancing the message success rate and reducing the delay time per message, particularly at high traffic density and high interference rates.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, a local area network (LAN) comprises a plurality of nodes, each node configured to transmit an RTS message requesting permission to transmit a DAT message that contains data, receive a CTS message granting permission to transmit the DAT message, transmit the DAT message responsive to the CTS message, and receive an ACK message indicating that the DAT message was received; and a base station configured to receive the RTS message, transmit the CTS message responsive to the RTS message, receive the DAT message, and transmit the ACK message responsive to the DAT message; wherein the base station is further configured to select a selected node of the plurality of nodes and transmit a CTS message to the selected node.

In a second aspect, a non-transitory computer-readable medium operates on a base station in a local area network (LAN), the base station in signal communication with a plurality of nodes, each node configured to transmit an RTS message requesting permission to transmit a DAT message that contains data, receive a CTS message granting permission to transmit the DAT message, transmit the DAT message responsive to the CTS message, and receive an ACK message indicating that the DAT message was received, the medium containing instructions for causing a processor in the base station to perform a method comprising selecting a particular node of the plurality of nodes according to a criterion, and transmitting a CTS message to the particular node, wherein the criterion is that the particular node has the largest number of accumulated backoff delays or the largest amount of accumulated backoff time or the largest amount of chronological time waiting to transmit a DAT message of the nodes in the LAN.

In a third aspect, a local area network (LAN) comprises a plurality of nodes, each node configured to transmit an RTS message requesting permission to transmit a DAT message that contains data, receive a CTS message granting permission to transmit the DAT message, transmit the DAT message responsive to the CTS message, and receive an ACK message indicating that the DAT message was received; and a base station, configured to receive the RTS message, transmit the CTS message responsive to the RTS message, receive the DAT message, and transmit the ACK message responsive to the DAT message; wherein a particular node of the plurality of nodes is configured to begin a backoff delay; while in the backoff delay, receive a CTS message from the base station; and transmit, responsive to the CTS message, a DAT message.

In a fourth aspect, a non-transitory computer-readable medium operates on a node of a plurality of nodes in a local area network (LAN) and in signal communication with a base station, wherein the base station is configured to receive an RTS message, to transmit a CTS message responsive to the RTS message, to receive a DAT message, to transmit an ACK message responsive to the DAT message, and to transmit a CTS message to a particular node of the plurality of nodes, the medium containing instructions for causing a processor in the node to perform a method comprising: transmitting an RTS message requesting permission to transmit a DAT message that contains data; starting a backoff delay; while in the backoff delay, receiving a CTS message granting permission to transmit the DAT message; and transmitting the DAT message responsive to the CTS message.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 7 is a flowchart showing an exemplary method for a base station to manage fragment transmissions, according to some embodiments.

Like reference numerals refer to like elements throughout.

DETAILED DESCRIPTION

Figure 1:
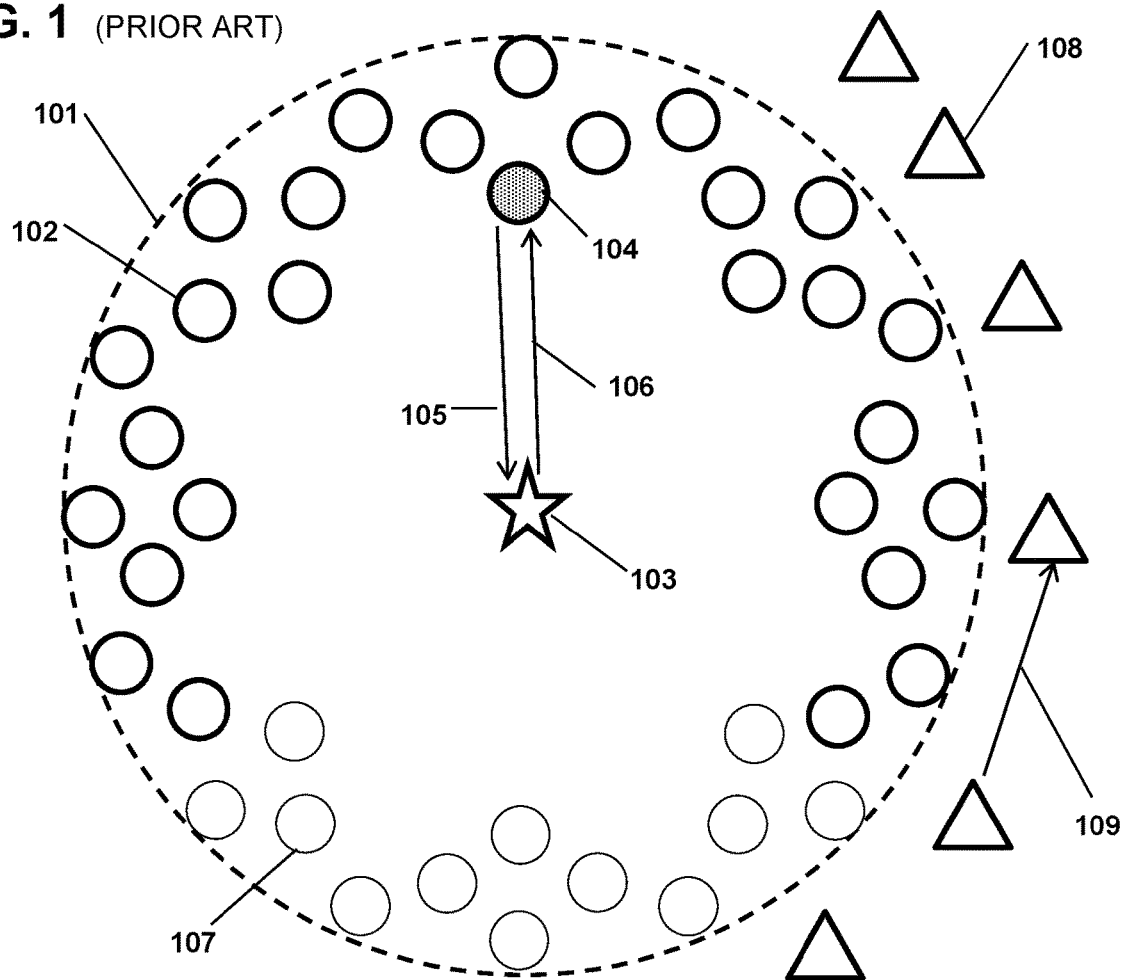
FIG. 1 is a schematic sketch of a LAN, according to prior art.

Systems and methods are disclosed herein (the "systems" and "methods", also occasionally termed "embodiments" or "arrangements", generally according to present principles) that can provide urgently needed wireless communication protocols to increase wireless throughput, reduce transmission delays, minimize failed messages, and avoid message collisions at high traffic density, according to some embodiments. Embodiments of the systems and methods may include a message sent from a base station to a node that is in a backoff delay, specifically allowing or instructing the node to terminate the backoff delay and transmit a DAT message without further delay. In examples, transmitting "immediately" or "without further delay" means transmitting after a necessary interframe space such as a SIFS. A "managed DAT transmission" is a transmission or retransmission of a DAT message by a node under the control or management of a base station, including transmission prompted by a CTS message that is transmitted by the base station responsive to a triggering event. A "triggering event" is the end of a period of interference or the end of a message or the end of another signal. By sending a CTS message to nodes that are in a backoff delay, the base station may enable the nodes to terminate the backoff delay, transmit the DAT message, and thereby avoid wasting time when the channel is clear. In addition, the base station may determine which node may transmit next, according to a criterion such as selecting the node that has had the most backoff delays or the longest accumulated delay time or the highest priority message to send. The base station may send a CTS to that most-delayed or highest-priority waiting node, thereby allowing that selected node to abort or terminate its current backoff delay and transmit the DAT. To assist the base station in determining which node is to be served next, each node may include, in an RTS message, a number or code indicating how many times that node has performed a backoff delay, or how long that node has spent in delay since its last successful transmission, or an indication of the DAT message priority, for example. The base station may read that value from the RTS message and may record it in memory, and may compare the various delay counts of the various nodes in the LAN to determine which node to select, and may send that selected node a CTS. As an alternative procedure, the base station may estimate how many times each node has been delayed by counting the number of times the base station has sent each node a CTS message but not yet an ACK message. Since the nodes are required to perform a backoff delay each time they fail to receive an ACK (due to a collision during the DAT, for example), the accumulated number of CTS messages to each node without an ACK may represent a delay count. The base station can thereby estimate which node is the most-delayed without relying on the nodes to report a value in their RTS messages. As a further option, the base station may count the number of times the base station has received an RTS message from each respective node without yet receiving a DAT message from that node, and may select the most-delayed node therefrom. Using either procedure, or a different procedure, to select a particular waiting node, the base station may then issue a CTS in response to a triggering event. Examples of triggering events are the end of an ACK message, the end of a corrupted or non-corrupted DAT message, the end of an RTS message from the selected node or from a different node, the end of a beacon message, the end of another message transmitted by the base station or by one of the nodes, or the end of a period of noise or interference. For example, the triggering event may be the end of an RTS message from a first node which is not the most-delayed node, yet the base station may send a CTS to a different node which is the most-delayed node, which would cause the selected node to send its DAT while the other node enters a backoff delay. Thus the base station may send a CTS message to a second node, responsive to an RTS message from a first node, when the second node has had more delays than the first node. The base station may transmit the CTS message after a brief space following the triggering event. The brief space may be one or two slots or one or two SIFS, or other predetermined time units specified by the base station; or alternatively the brief space may be one PIFS which is larger than a SIFS but less than a DIFS, or other interval less than a DIFS, or other interval less than the time that a node is required to delay before sending an RTS message. By sending the CTS with such a brief space, less than the delay required of nodes wishing to send an RTS, the base station thus preempts any transmissions from other nodes, because any node that wishes to send an RTS must wait for a longer DIFS interval, after the end of other messages or interference, before transmitting. By allocating network access to a selected node according to the node's accumulated delays, the base station may provide equal opportunity for each of the nodes to transmit sequentially, rather than allowing a few nodes to dominate the channel. As a further alternative, the node may indicate in its RTS that it has a high-priority message or a high-QOS (quality of service) message or an emergency call, and the base station can then provide that node an early transmission opportunity by sending it a CTS when the channel is clear.

Wireless communications generally occur within a LAN (local area network), which generally includes a plurality of independent wireless users or "nodes" communicating with a central or supervisory "base station" (also called an "access point"). A node may initiate communication by sending an RTS message to the base station, requesting permission to continue. The base station may send a CTS message in reply, granting permission for the node to send a data or DAT message. After receiving the DAT message, the base station may send an ACK acknowledging receipt. A CTS message may also define a "Reserve" (also called a "NAV" or "contention-free state") that prevents interference from other nodes. The Reserve typically extends for a time sufficient to protect the DAT message plus a confirmatory reply message such as an ACK. A node may have a large amount of data to send, and may break the data into an integer number of fragments to be transmitted in a series of DAT messages, and may indicate, in its RTS message, how many fragments there are. Then the base station may prompt the node to transmit each fragment in turn by sending CTS messages sequentially, each CTS indicating which fragment is to be sent. That way the base station can cause the node to retransmit a corrupted fragment, or to send fragments in any order, finally finishing with a single ACK when all fragments have been received.

An advantage of managed DAT transmission, as disclosed herein, may be that the throughput of the LAN may be increased, especially in high traffic density conditions which may otherwise result in congestion and the Blocked Node problem. A further advantage may be that the node may be permitted to retransmit a corrupted DAT immediately, rather than having to undergo a delay and then start over with an RTS message. A further advantage may be that high-priority messages may be given advantage by the base station when the node indicates, in its RTS message, that the DAT message is high priority. A further advantage may be that the message failure rate may be reduced. A further advantage may be that the message throughput is enhanced by avoiding wasted time, such as unnecessary backoff delays during times when the channel is available. A further advantage may be that the fairness and/or uniformity may be enhanced by prompting the most-delayed node to transmit, thereby providing equal access to all of the same-priority nodes. Other advantages and benefits are discussed in the examples below.

Most of the examples are based on the CSMA/CA (carrier-sense multiple-access with collision avoidance) protocols which stem from the IEEE 802.11 protocols; however, embodiments of the disclosed systems and methods may be beneficially applicable to other wireless communication protocols as well. Further enhancements and variations not specifically discussed may also benefit from the disclosed systems and methods, as will be recognized by one of ordinary skill in the art given this disclosure. As used herein, a "wireless message" is information transmitted by radio-frequency waves. In reference to wireless messages, "send" means "transmit", and "listen" means "receive". A message is "sent to" a specific intended recipient if the address (such as the MAC address) of the intended recipient is included in the message. An RTS message is a message sent by a transmitting node, typically to the base station, requesting permission to send a data packet. A CTS message is a message sent by the base station or receiving node in reply to an RTS, granting that permission. A DAT message is a longer message, containing the data packet, that a node sends upon receiving a CTS message. An ACK message is a message sent by the base station or receiving node, indicating that the DAT message was received. A "post-DAT CTS message" is a CTS message, or the like, that a base station may send to a node after determining that its DAT message was corrupted; the CTS message thereby instructs the node to retransmit the DAT message immediately rather than performing a backoff delay. A "prompt" is a CTS message, or the like, that the base station sends to a node to cause the node to abort a backoff delay (if present) and to send a DAT message without further delay. For example, the base station may detect that an interference has ended and the channel is clear, then may prompt a node to transmit by sending it a CTS. "Control" type messages include the RTS, CTS, and ACK messages, whereas "data" type messages include DAT messages. Control type messages generally do not contain the kind of data that DAT messages convey. A "byte" is 8 bits. When bytes or bits are numbered in the examples below, for clarity the numbering starts with 1, rather than 0, and bit sequences are shown in regular order, as opposed to reverse order. A "slot" is a unit of time which typically includes a small number of bytes, such as 6 or 10 or 14 bytes, of transmitted data. In some LANs, a slot represents the maximum amount of time required for a message to travel from any node in the LAN to the base station, or alternatively to a maximum round-trip travel time between the base station and a node, including receiver lag. A slot time may be as short as 1 to 5 microseconds, or shorter, in a compact or high-frequency LAN with high modulation rates, and may be as long as 10 or 20 or 100 microseconds, or longer, for an extended LAN or for slow modulation rates. In examples, time may be demarked in bits or bytes or slots or microseconds or words or symbols or other suitable time units, as appropriate. A "sequence chart" is a chart showing items, such as bits or messages or message components or intervals, sequentially in time, resembling an oscilloscope trace or a logic analyzer display.

A wireless communication may be termed a "packet", a "message", or a "frame" herein. A "node" is a communication device serving a user application, typically including a wireless transmitter, a receiver (or a transceiver), and a processor which is configured to analyze signals from the receiver and cause the transmitter to transmit messages. Examples of nodes include mobile phones, smart sensors, personal computers, automated industrial machines, and interconnected vehicles, among the many types of devices configured to communicate wirelessly. A base station is a communication device, typically connected to the Internet or other network, including an antenna, transmitter, receiver, and processor configured to analyze signals from the receiver and to cause the transmitter to transmit messages to nodes of a LAN, and also to manage the timing and other parameters of the LAN. The base station may update the parameters and communicate the updates to the nodes by periodically transmitting "beacon" messages to the nodes of a LAN. In some LAN configurations, the nodes communicate only with the base station, while in other configurations the nodes can communicate directly with each other. Base stations may also manage communications between adjacent LANs, for example by exchanging messages or other information using a wired connection or other communication medium, which is usually but not always distinct from the wireless medium employed by the nodes. Communication links from a base station to the wider network infrastructure are treated as "wired" herein, although they may include conductive cables, optical fibers, microwave beams between fixed sites, satellite links, etc. "Traffic" is the amount of wireless communication detected by each of the nodes or by the base station (not to be confused with vehicle traffic). A "collision" is interference between two simultaneous wireless messages on the same channel or frequency, generally resulting in both messages being garbled (not to be confused with physical collisions between vehicles). The terms "message-collision" and "vehicle-collision" may be used to avoid possible confusion. A "channel" is a frequency band used for wireless communication. "Collided", "corrupted", "garbled" and equivalent terms may be used to describe messages affected by interference. In contrast, a message is "received" if the message signal was detected and demodulated and decoded without failure and in agreement with a Frame Check Sequence, or the like, in the message. Thus if a message is corrupted, it is not "received", notwithstanding that its signal had been detected and analyzed by a receiving entity. The wireless "traffic density" is a measure of the amount of communication on a channel. The wireless traffic density may be represented by a parameter P, which equals 10 million times the probability that a particular node initiates a new RTS message in a particular time slot. For example, a traffic density P of less than about 700 generally represents a low traffic density in which collisions are rare and most nodes can transmit at will or with minimal delay. A traffic density P in the range of about 700 to about 2500 corresponds to a medium traffic density in which nodes are likely to experience a small number, such as one or two, delays before completing a message. A traffic density P of greater than about 2500 generally corresponds to high traffic density in which most nodes spend most of the time in a backoff state waiting for a chance to transmit. A "message completion" is a complete RTS-CTS-DAT-ACK sequence transmitted and received. In contrast, an RTS message is "unfulfilled" while the transmitting node has not yet received an associated ACK message. For example, a node that is in backoff waiting to transmit its DAT message has an "unfulfilled RTS message". An "initial message attempt" is an RTS message preceded by receiving an ACK; hence the initial message attempt is the first RTS, in a sequence of messages and backoff delays, related to a particular DAT message. The message throughput or success rate S equals the number of message completions per one million slots. The message failure rate F is the number of messages that are ultimately dropped due to having been delayed an excessive number of times. In examples, a DAT message that has been delayed 10 or more times is considered to have failed, and is dropped. The average delay time D is the average amount of time that a node spends in a delayed or backoff state, per million slots. The collision rate C is the number of message collisions per million slots. A "confirmatory reply" for an RTS is a CTS, for a CTS is a DAT, and for a DAT is an ACK. There is no confirmatory reply for an ACK. "Congestion" or "saturation" is a condition in which the wireless traffic density is so high that most of the nodes spend most of their time waiting for a chance to send their messages. A "carrier signal" is a radio-frequency signal indicating that a message is in progress or is imminent. A node is "blocked" if it is forced to delay indefinitely while other nodes, with the same status or priority, are permitted to transmit multiple times. A "backoff delay" is a delay imposed on a node due to a collision or to detecting another message which is already in progress when the node is ready to transmit. A backoff delay typically includes a predetermined "waiting interval" plus a randomly selected portion "Rand" of a predetermined contention window. A "contention window" CW is a predetermined interval of time, during which a node may transmit a message unless the channel is already busy. A node wishing to send a message when the channel is busy is required to perform a backoff delay by selecting, at random, a portion of the contention window, then after the waiting interval plus the randomly-selected portion of the contention window, the node may then transmit unless another node is already transmitting at that time, in which case the ready node must perform another backoff delay. "Random" and "pseudorandom" are treated as equivalent herein. Some references refer to the waiting interval as "CWmin", meaning the starting time of the contention window. Likewise "CWmax" is the time of the end of the contention window, and "CWwid" is the width of the contention window. Thus, CWmax=CWmin+CWwid. The total backoff delay equals CWmin plus a random number (ranging from 0 to 1) times CWwid. In engineering terms, the contention window is a delayed gate, wherein the gate is the contention window, and the gate delay is the waiting interval. Backoff delays are intended to spread out the transmission attempts in time, thereby preventing multiple nodes from transmitting at the same time. However, if the backoff delay is too long, throughput may be reduced. To avoid having multiple transmissions starting at the same time, each node wishing to transmit may first sense whether the medium is busy by detecting any wireless messages or carrier signals that may be present. If no carrier signal is present, the node determines that the channel is clear, and may transmit. If the node detects the carrier signal of another message already in progress, the node must perform a backoff delay before again attempting to transmit. While in a backoff delay, upon detecting another message on the channel, the delaying node may simply stop timing its backoff delay while the other transmission is in progress, and then resume timing the backoff delay as soon as the channel is clear. In this way, the nodes compete for an opportunity to transmit. A backoff delay may be "terminated" or "aborted" by transmitting a DAT message-in-waiting when instructed, and then closing the backoff timer, or equivalent, and resuming normal node operations. However, if the node does not receive an ACK as expected, the node must continue the previous backoff delay or begin a new backoff delay.

To avoid collisions, a node sending an RTS message may request a "Reserve" interval by including a duration value in the RTS message. The RTS Duration value normally is the total duration of a CTS, DAT, and ACK sequence (plus spaces, etc.). The Reserve interval (also called a "NAV" or "contention-free" interval) prevents the various nodes from transmitting for an amount of time. The base station may confirm or approve the Reserve request by repeating the Duration value in the responsive CTS message (optionally after subtracting the length of the CTS message). The Reserve interval requested by an RTS message may be termed an "RTS-Reserve", while that specified by the CTS may be called a "CTS-Reserve", to keep these two types separate. A "hidden" node, as viewed by a first node, is a second node of the LAN that is too far away from the first node to detect signals from the first node, and likewise the first node usually cannot detect signals from the second node. All nodes in a LAN can detect communications from the base station, and the base station can detect communications from all of the nodes in the LAN; hence none of the nodes is hidden as viewed by the base station. As viewed by each node, the number of hidden nodes depends on their spatial distribution, their transmitter power, modulation rate, any intervening absorbers or scatterers, and other factors. The "hidden node problem" is a tendency for two nodes that are hidden from each other to transmit messages that collide. The Reserve state, imposed by an RTS or CTS message based on the Duration datum, largely resolves the hidden node problem for the remainder of the message sequence, although the RTS message itself remains vulnerable. Throughout the examples, a node or base station may be described as "listening" for a message or "seeing" interference; each such term is a euphemism for receiving wireless signals; likewise a system "knows" something if it has information about that thing.

A "failed transmission attempt" is a wireless message that was transmitted but not received by the intended recipient. Such failure may be due to a wireless message collision or other interference or noise, for example. From the point of view of a node, a failed transmission attempt is an RTS which is not followed by a CTS, or a DAT which is not followed by an ACK, within a predetermined "listening" time interval. A failed transmission attempt may also be a node that commits-to-send while another node's carrier signal is detected, or a commit-to-send while another node's Reserve interval is in effect. In each case of a failed transmission attempt, a backoff delay is "required", that is, the ready node is obligated to delay for a waiting period plus a randomly selected portion of a contention window, and only then may attempt a transmission. The length of a backoff delay may be adjustable according to the number of times the node has tried to send the message, and/or other parameters. For example, in a protocol termed "binary exponential backoff", each node must double its contention window width after each failed attempt, thus increasing its next delay on average after each backoff, up to a predetermined maximum delay. After the message is finally completed, as indicated by receiving an ACK, the node then reverts back to the initial short delay time for its next message. As used herein, "fairness" means providing a competitive advantage to nodes that have waited longest, relative to other nodes that have not waited so long. "Equality" means providing equal transmission opportunities to all the nodes in a LAN, their priorities and other factors being equal. The "Blocked Node problem" is a form of congestion at high traffic density in which one or more nodes in a LAN are forced to remain in a backoff state indefinitely while other nodes are permitted to transmit repeatedly. "SIFS", "PIFS", and "DIFS" are various interframe spaces which are generally provided between messages. A SIFS is the shortest space, often being just one slot; the PIFS is a medium length, such as two slots; and the DIFS is the longest, such as three slots; other lengths are possible. These interframe spaces serve to separate the messages, and also to allow the nodes and base station to listen for possible interfering signals between messages. A node wishing to send an RTS is typically required to wait for a long DIFS space after some prior message or interference has terminated, and then may transmit if the channel is clear. The base station, on the other hand, may send a CTS or ACK after only a short SIFS space, and thereby can preempt the nodes and maintain management control over the LAN. The ready node, detecting the base station's transmission, then does a backoff delay before trying again.

The nodes may determine a delay parameter and may include that parameter in an RTS message. For example, a node may count the number of times it has entered a backoff delay after receiving an ACK message, thereby tallying the backoff count for the current DAT message. Alternatively, the node may determine the amount of time that the node has spent in backoff delays, or the chronological time since the node's initial transmission attempt related to the current DAT message. Such counts or tallies may be termed the "accumulated" delay related to the current DAT message. When the DAT message is finally transmitted and a responsive ACK received by the node, the accumulated delay count or value may be reset to zero. The node may include the accumulated delay value in each RTS message so that the base station may determine which node currently has the largest accumulated delay. The base station may keep a table of values, received from each respective node, and thereby can select which node is the most-delayed, and may send a CTS to that most-delayed node. Alternatively, the chronological delay for each waiting node may be calculated by each node or by the base station, for example by subtracting the time of the initial transmission attempt from the current time, or by running a clock counter starting upon the initial transmission attempt, among other possibilities.

Alternatively, the base station may estimate the delay parameter by counting the number of times the base station has sent a CTS message to each node without receiving a corresponding DAT, and then zeroing the count upon sending the node an ACK message, respectively. Alternatively, the base station may count the number of times the base station has received an RTS message from each node without receiving a corresponding DAT, among other combinations. The base station can also determine the chronological time for each node by starting a timer upon receiving an RTS message from a node and then resetting the timer to zero upon sending the node an ACK, among many other ways.

Turning now to the figures, FIG. 1 is a sketch showing a LAN 101 such as may be found in an office environment or instrumented building for example, according to prior art. The LAN 101 includes a plurality of nodes 102 and a base station 103. A particular node 104 (stipple) is shown sending an RTS message 105 to the base station 103, which replies with a CTS 106. Hidden nodes 107, as viewed by the particular node 104, are shown in lightline. Several external nodes 108 are shown as triangles outside the LAN 101. External nodes 108 may exchange messages 109, causing interference with the LAN messages. Other sources of interference include switchgear, motors, microwave ovens, and other sources of radio-frequency energy.

Figure 2:
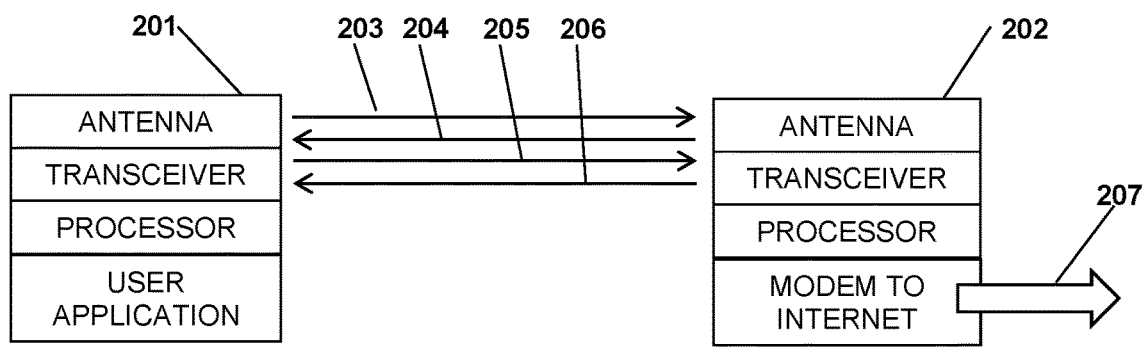
FIG. 2 is a schematic showing components of a node and a base station according to prior art.

FIG. 2 is a schematic depiction of a node 201 and a base station 202, communicating according to prior art. The node 201 includes an antenna, a transceiver (or a receiver and a transmitter), and a processor which is connected to a user application such as a mobile phone, a computer, a smart sensor, or other device. The base station 202 includes another antenna, transceiver, and processor, and is usually connected to a wider network 207, such as a modem connected to the Internet. Also shown are messages, such as an RTS message 203, a CTS message 204, a DAT message 205, and an ACK message 206 which the node 201 and the base station 202 exchange.

If the node 201 wishes to transmit a message, the user application passes data to the processor, which encodes the message and passes it to the transceiver, which modulates the encoded data and passes it to the antenna, which transmits electromagnetic waves containing the encoded data. At the base station 202, its antenna receives the waves, its transceiver demodulates them, its processor decodes the signal and passes the decoded data to the modem or other interface. Messages from the base station 202 are transmitted in a similar way and received by the node 201 in a similar way.

Figure 3A:
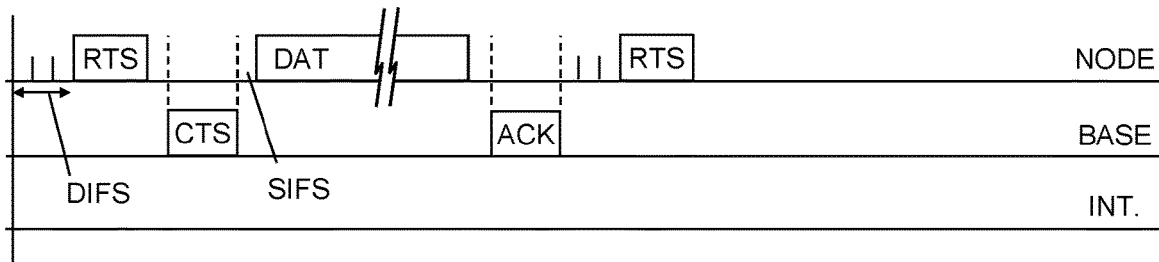
FIG. 3A is a sequence chart showing an RTS-CTS-DAT-ACK message sequence according to prior art.

FIG. 3A is a sequence chart showing a series of messages according to prior art. Messages by a node (NODE), a base station (BASE), and interference from an external source (INT) are shown as boxes on three timelines, similar to a logic analyzer display. Vertical dashed lines indicate synchrony or causation at various times. The vertical solid line at left indicates a starting time, which may represent the ending of a previous transmission (not shown) or other moment when the node commits to send a message. Before sending, the node waits for a DIFS interval, depicted as three slots by short marks as shown, and may then transmit an RTS message if there is no interference detected during the DIFS time. Then, after a short SIFS interval depicted as one slot, the base station transmits a CTS message that grants permission for the node to proceed. The node, after receiving the CTS and waiting one SIFS, then transmits a DAT data message. The DAT message is shown truncated to fit on the page, since DAT messages are typically much longer than the other messages. If the base station receives the DAT with no collisions or interference, the base station then transmits (after a SIFS) an ACK acknowledgement, and the process is done. The potentially interfering external node INT was silent in this case, and no collisions occurred.

Figure 3B:
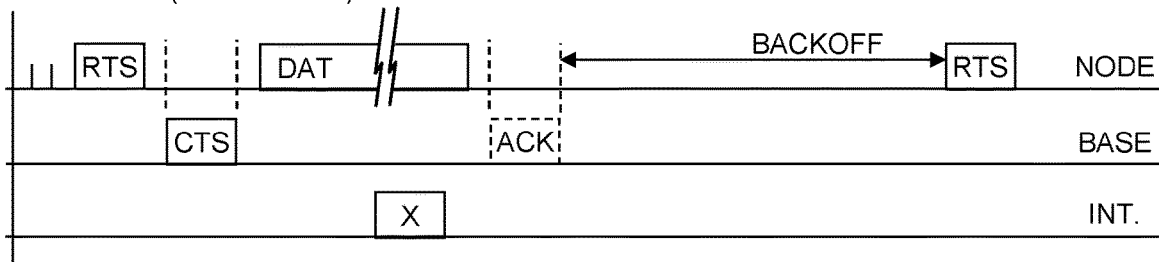
FIG. 3B is a sequence chart showing a delayed transmission according to prior art.

FIG. 3B is a sequence chart showing a message collision according to prior art. In some protocols, a node that transmits a DAT and fails to get an ACK must delay for a backoff time before trying again. The node transmits an RTS, gets a CTS, and sends its DAT message. However, this time there is interference X which collides with the DAT. The node generally has no way of determining that its DAT message was collided, because receivers generally cannot receive signals while the local transmitter is active, since the power emitted by the transmitter would saturate the sensitive receiver circuits. Other nodes can detect the collision, however, according to the Field Check Sequence provided in most messages or the occurrence of illegal modulation or illegal codes, among other ways. The base station, after detecting the DAT message and determining that it is corrupted, takes no action; specifically, it does not send the expected ACK (shown in dash). The node, failing to receive an ACK, thereby determines that its DAT was collided or some other mishap occurred. The node then enters a backoff delay, after which it may retransmit the RTS to start over again. Thus interference, even brief interfering signals, can disrupt wireless traffic and reduce throughput.

Figure 3C:
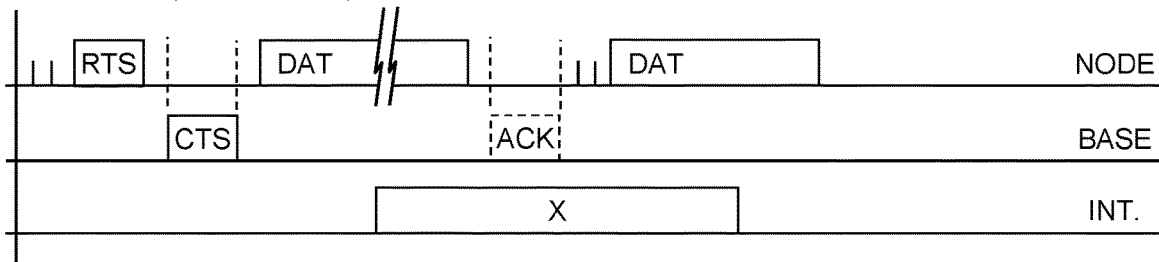
FIG. 3C is a sequence chart showing multiple collisions according to prior art.

FIG. 3C is a sequence chart showing multiple collisions according to the prior art. In some protocols, a node that fails to get an ACK may retransmit its data message without a backoff delay and without repeating the RTS-CTS handshake. In the depicted case, the node sends an RTS, gets a CTS, and transmits its DAT message, but the interference source INT emits noise X that interferes with the DAT message. In addition, X continues beyond the end of the DAT. The node in this case does not detect the continuing interference after the DAT; perhaps it is hidden. However, the node determines that something went wrong with its first DAT message when it fails to receive an expected ACK (in dash). The node then spontaneously retransmits its DAT message after a short listening interval such as a DIFS. Unlike the case of FIG. 3B, in this example the node retransmits the DAT without undergoing a backoff delay. The second DAT transmission again collides with the ongoing interference, leading to further delays and inefficiency.

As demonstrated in FIGS. 3B and 3C, the prior-art responses to collisions can result in additional collisions and repeated delays, further increasing the number of retransmitted messages and reducing the overall success rate. Such problems usually become much worse as the traffic density increases.

Figure 4A:
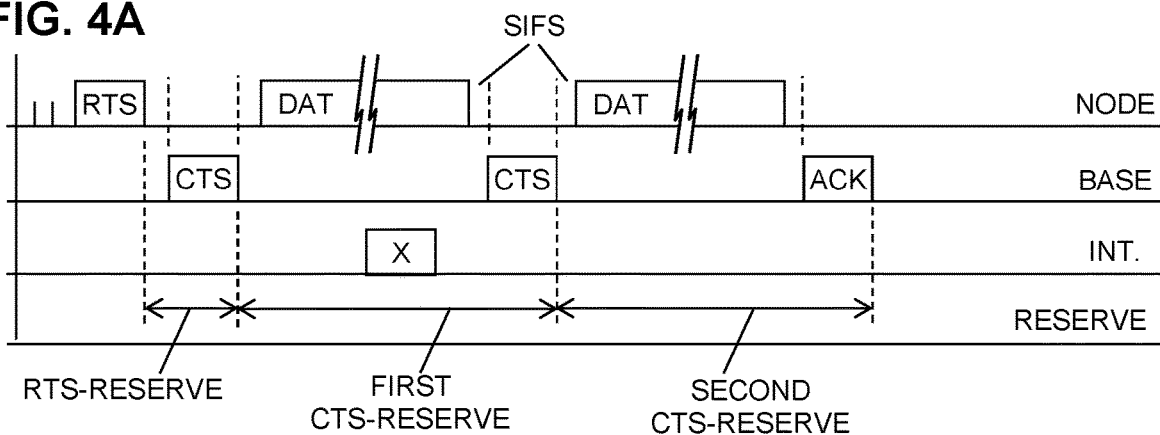
FIG. 4A is a sequence chart showing an exemplary DAT retransmission following a collision, according to some embodiments.

FIG. 4A is a sequence chart showing an exemplary series of messages that may mitigate a wireless collision using managed DAT transmission, according to some embodiments. The node initially transmits an RTS, and receives a CTS reply, then begins transmitting the long DAT message. However, an interference source INT transmits a signal X, thereby corrupting the DAT. The node has no way to know that its DAT was corrupted, and therefore continues transmitting the DAT message until done. The node then listens for the expected ACK message, but the base station does not send an ACK message because it has determined that the DAT was corrupted. Instead, the base station sends another CTS message addressed to the node. The trigger event is thus the end of the corrupted DAT message, which causes the base station to transmit the second CTS.

By sending a CTS message instead of an ACK in response to the trigger event (the end of the DAT), the base station thereby informs the node that there was something wrong with the DAT, and furthermore instructs or commands the node to retransmit the same DAT message again. Accordingly, the node detects the second CTS when an ACK was expected, recognizes from this that the DAT was not received properly, and also that the base station has granted the node permission to retransmit the DAT without a backoff delay. The node immediately (after one SIFS) retransmits the DAT. The retransmitted DAT is then completed without further mishap, and the base station sends a confirmatory ACK. The figure also shows that the base station transmits the second CTS message after just a short SIFS space, and likewise the node starts its second DAT after a short SIFS interval, thereby ensuring that other competing nodes are caused to withhold until after the current sequence is complete.

The figure also shows a Reserve line, on which a sequence of Reserve states is shown. In each Reserve state, the nodes (other than the one addressed in the CTS message) are not permitted to transmit. In this and the other examples involving a Reserve state, the node and base station do not actually send explicit messages that announce the Reserve states. Rather, each node is configured or programmed in advance, to detect each RTS message in the LAN and automatically interpret each RTS message as imposing an RTS-Reserve or transmission prohibition on the other nodes, and additionally that the prohibition continues for a period equal to a CTS length plus a time less than or equal to one DIFS, thereby protecting the CTS message and associated interframe spaces. No other signal is required to "impose" the RTS-Reserve; the nodes are already configured to understand it. In addition, the nodes are configured to interpret a CTS message as imposing a CTS-Reserve transmission prohibition on the other nodes, for the full duration specified in the CTS. In the figure, the RTS-Reserve state extends just to the duration of the expected CTS plus the expected SIFS space between the RTS and CTS, thereby protecting the CTS message only (plus optionally a small amount of additional time if needed to cover timing variations). The CTS message includes a Duration value, which establishes the first CTS-Reserve state extending to the end of the first DAT and the subsequent CTS message, and likewise the second CTS establishes the second CTS-Reserve state extending through the final ACK.

An advantage of terminating the RTS-Reserve at the end of the expected CTS message may be that, in event that the CTS message is collided or absent, access to the channel will be opened up much sooner than if the RTS-Reserve extended to the end of a future ACK. If the CTS message is collided or absent, the short RTS-Reserve will expire after a few slots corresponding to the length of a CTS message, so that the various nodes may resume transmitting sooner than if the RTS-Reserve had extended for the full duration of a long DAT plus ACK messages. Configuring the various nodes to respect an RTS-Reserve that includes the expected CTS, but not the expected DAT and ACK messages, can thereby avoid unnecessary delays and enhance throughput.

Of course, the DAT and ACK are still protected by the CTS-Reserve if the CTS message is not corrupted.

It may be beneficial to treat messages from the base station as instructions or commands to the nodes, rather than merely informative messages. Optimal throughput in a wireless network is generally obtained when the base station actively manages the communications, as with managed DAT transmission, by issuing commands to control specifically which nodes are permitted to transmit which DAT messages, and when. The two CTS commands in this example instruct the node to transmit its DAT message, and the ACK command instructs the node to record a successful message completion and cease transmissions. In addition, if the node wishes to send another DAT, it must again perform another RTS-CTS handshake to obtain permission. The base station thus controls the timing of each message other than the timing of the RTS, which is node-spontaneous. In a similar way, RTS messages are managed in the sense that they are permitted only while a Reserve state is not raised, and also are required to wait at least one DIFS (detecting no traffic or carrier signal or interference therein) before sending an RTS. It is in each node's advantage to allow the base station to actively control the communications because the nodes thereby avoid collisions and optimize their own success rate.

Figure 4B:
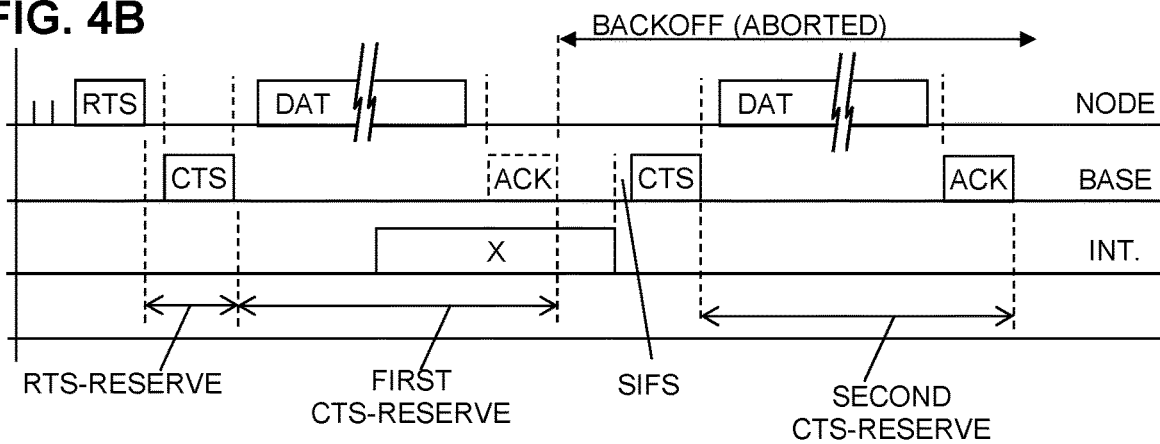
FIG. 4B is a sequence chart showing an exemplary aborted backoff delay, according to some embodiments.

FIG. 4B is a sequence chart showing an exemplary series of messages that, with managed DAT transmission, can mitigate a prolonged interference, according to some embodiments. In this example, the base station waits until the interference has ended, and then prompts a waiting node to abort its backoff delay and transmit. As shown, a node transmits an RTS, the base station replies with a CTS command, and the node transmits its DAT. However, an interference signal X occurs which collides with the DAT, and also continues after the DAT message for a period of time. The node, after transmitting its DAT, listens for an ACK (shown in dash), but the base station does not transmit an ACK because the base station has detected that the DAT was collided, and also detects that the interference is ongoing. The node may or may not be able to detect the interference, depending on signal levels and many factors. However, the node can determine that a problem has occurred because the node fails to receive an ACK or a second CTS. In that case, the node is required to begin a backoff delay before trying an RTS again. Then, the base station detects the end of the interference and, after a short SIFS space, transmits a second CTS command to the node. The end of the interference X is the triggering event, which causes the base station to transmit the second CTS. The node is configured to receive and interpret messages while in a backoff delay, and thus interprets the second CTS as a command to abort the backoff and retransmit the DAT. The node does so. The second DAT transmission was successful, the base station replies with an ACK command, and the process is done. In this way, the base station actively manages the node behavior by instructing the node to retransmit the DAT as soon as the interference has ended. In addition, the base station has avoided potential collisions with various nodes in the LAN by transmitting the second CTS after only a short SIFS interval following the end of the interference, while the other nodes must wait a full DIFS, and likewise the node transmits its second DAT after only a SIFS for the same reason. Although the second CTS is not protected by a Reserve state in this case since the first CTS-Reserve state has expired, the short SIFS space after the end of the interference allows the base station to begin transmitting before any of the nodes, and thus the CTS is protected by timing since the nodes would detect the base station's message and would refrain from transmitting. To summarize: following a DAT message, the base station may send an ACK if the DAT was received without collisions or interference; the base station may send a CTS to prompt a retransmission if the DAT was corrupted; the base station may do nothing if the interference is continuing, and then may transmit the CTS after the interference has ended. Likewise the node that transmitted the DAT may be configured to retransmit the DAT when it receives a CTS instead of an ACK; and if it receives an ACK, the node may determine that the DAT was received without interference, or the node may simply to do nothing; and responsive to receiving neither a CTS nor an ACK, the node may begin a backoff.

Figure 5:
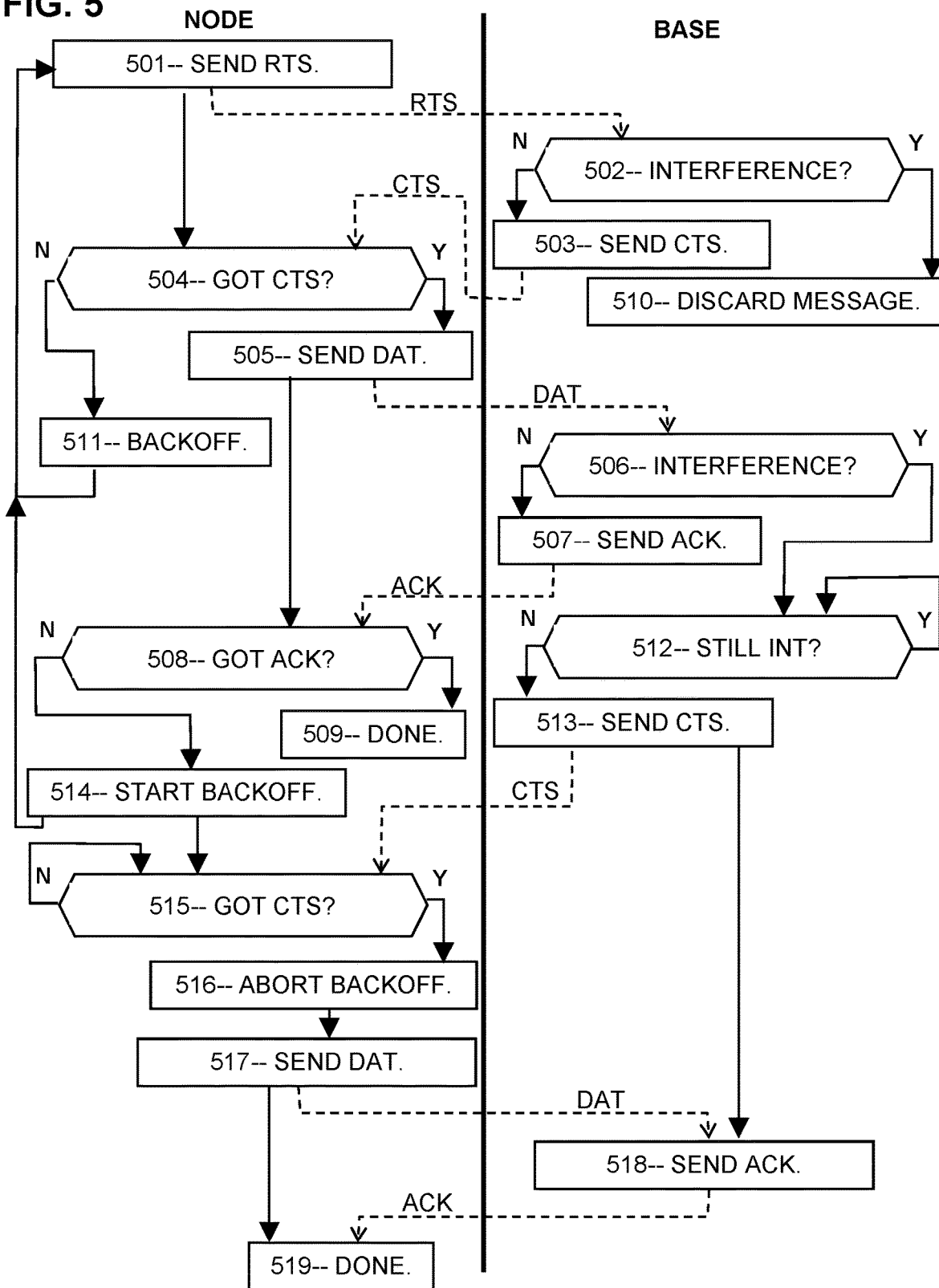
FIG. 5 is a flowchart showing an exemplary method for avoiding collisions, according to some embodiments.

FIG. 5 is a flowchart showing an exemplary method for a base station to actively manage a node's transmissions, according to some embodiments. In this and the other flowcharts, the actions of a node are shown at left, actions of the base station are shown at the right, and wireless messages are shown by dashed arrows going between the left and right sides. The solid arrows on the left show the logic sequence for the node, and the solid arrows on the right show the sequence of the base station.

At 501, a node sends an RTS message to the base station, which detects the message and, at 502, checks for interference or other defect. If the RTS is corrupted, the base station discards the message at 510. If the RTS is good, the base station sends a CTS message to the node at 503. At 504, the node listens for the CTS and, if it fails to receive the CTS, begins a backoff delay at 511 before again trying to send its RTS. But if the node detects the CTS at 504, the node sends its DAT message at 505. At 506 the base station detects the DAT and checks for interference or other corruption, and if the DAT is good, the base station sends an ACK at 507. If the node receives the ACK at 508, at 509 the node is done. But if the node fails to receive the ACK at 508, then the node starts a backoff delay at 514, before again attempting its RTS. While in backoff, the node continues to monitor messages.

Returning to the interrogator at 506, if the base station determines that the DAT is defective, the base station can then continue to monitor the channel to determine, at 512, whether the interference has passed. When the interference has passed, the base station then sends a second CTS at 513, thereby releasing the node from its backoff delay. At 515, the node receives the second CTS, aborts its backoff at 516, and retransmits its DAT at 517. This time the base station receives the DAT with no problems at 518 and sends an ACK, which the node receives at 519.

As an alternative, not shown, the interference may be so prolonged that the backoff state at 514 expires before the interference has passed. When the backoff state at 514 expires, the node may detect the ongoing interference, and would then begin an additional backoff delay. However, if the node is not able to detect the ongoing interference, the node may try an RTS again, but the second RTS would fail due to the continuing interference, and the node would not get a CTS reply because the base station knows that the interference is ongoing. Then the node, upon failing to get a reply to its second RTS, would again start a backoff delay. In either case, then, the node would remain in a series of backoff states as long as the interference continues, at which time the base station sends it a CTS so the node can terminate the backoff and transmit the DAT.

Figure 6A:
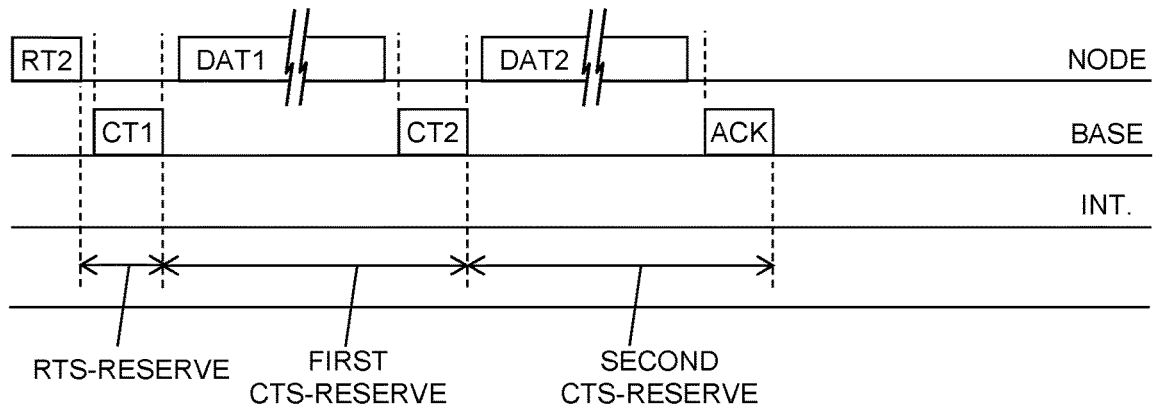
FIG. 6A is a sequence chart showing an exemplary transmission of two fragments, according to some embodiments.

FIG. 6A is a sequence chart showing an exemplary series of messages including a managed DAT transmission to accommodate message fragments, according to some embodiments. Here a node wishes to send an amount of data that exceeds a predetermined size threshold, and therefore has split the DAT into two fragments, DAT1 and DAT2. In addition, the node has included, in its RTS message, the number of planned fragments, in this case two fragments. The RTS message is therefore labeled RT2 in the chart, meaning an RTS message that specifies that two fragments are available. The base station then transmits a CTS message, labeled CT1, which includes an indicator of the desired fragment number, which is fragment number one. The CT1 message thereby instructs the node to transmit the first fragment. The node receives the CT1 command and transmits the first fragment DAT1 as instructed, and then listens for the next command. The base station, after successfully receiving the first fragment, then instructs the node to send the second fragment by sending it another CTS message, this time specifying fragment two, which is shown as CT2. The node complies by sending DAT2. Then the base station sends an ACK to indicate that all the fragments that were initially specified in the RTS message (RT2) have been received, and the node is done. To summarize the depicted sequence: the node tells the base station in its RTS how many fragments the node has to send, and the base station prompts the node to send each fragment sequentially by sending CTS messages that specify which fragment to send. The node, upon receiving each CT1 or CT2 command, transmits its DAT1 or DAT2 fragment accordingly. After receiving all fragments, the base station sends an ACK message indicating so.

In addition, the RT2 message may include a duration value which is related to the size of the fragments. The base station may adjust that value and include it in the CT1 and CT2 messages, so that the other LAN nodes may determine how long to refrain from transmitting. As depicted, the presence of the RT2 message itself automatically implies an RTS-Reserve that encompasses the first CT1 message. Thereafter, the Reserve state is continued by the CTS messages. The CT1 message specifies the duration of a first CTS-Reserve state that encompasses DAT1 and CT2, and the CT2 message specifies a second CTS-Reserve state encompassing the DAT2 and ACK messages. The various nodes of the LAN are configured to receive the RT2 message (if not hidden) and to automatically self-impose a delay encompassing the CT1 command. Likewise the nodes are configured to interpret the CT2 command as specifying a second CTS-Reserve state that extends for the a Duration datum in CT2, such as the length of the DAT2 plus ACK messages, thereby protecting the DAT2 and ACK messages. The nodes may be configured to interpret the ACK message as terminating the CTS-Reserve state, even if the full duration specification has not yet expired. Often the last fragment is shorter than the others, in which case the ACK, by terminating the Reserve, thereby allows the nodes to resume normal activity sooner than if they had been forced to wait the full duration value on the last fragment. Wasted time is thus eliminated.

Figure 6B:
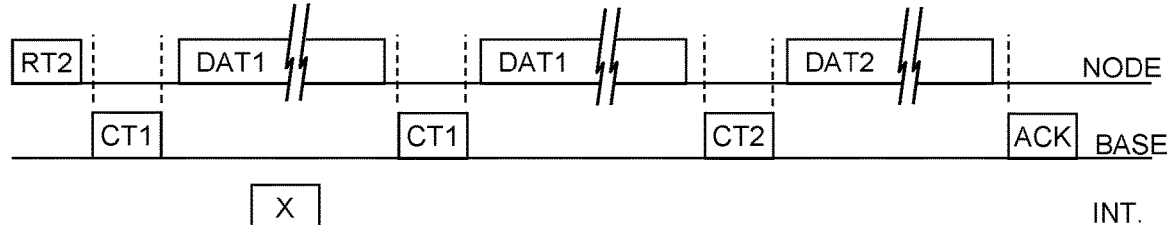
FIG. 6B is a sequence chart showing an exemplary transmission of two fragments following a collision, according to some embodiments.

FIG. 6B is a sequence chart showing an exemplary series of messages including a managed DAT transmission to mitigate a collision, according to some embodiments. As in the previous example, a node wishes to send two fragments, DAT1 and DAT2. To indicate this, the node transmits an RTS message that includes the number of planned fragments within the RTS message, which is shown in the figure as RT2. The base station transmits a CT1 message that instructs the node to send fragment DAT1, which the node does. However, this time the INT transmits noise X which collides with the first fragment. The node does not know this, and therefore expects a CT2 message which would enable the node to send the second fragment. The base station does know that the first fragment has been collided, for example by checking the Frame Check Sequence within DAT1 or by detecting out-of-spec modulation, or otherwise. The base station can also detect that the interference has ended by the time the DAT1 message is finished, and that the channel is then clear. Therefore, the base station re-transmits the CT1 command calling for the first fragment again. The node receives the second CT1 command rather than a CT2, and therefore determines, from the fragment number specification in the CT1 command, that the DAT1 was collided or otherwise not received in good order, and that the base station instructs the node to re-transmit the DAT1 fragment again. The node does so, and the second transmission of DAT1 was successful. Then the base station transmits a CT2 command which instructs the node to send the second fragment DAT2. The node sends it without further incident, and receives an ACK acknowledgement which indicates that the node is done. In this way, the base station can efficiently mitigate a collision that interferes with one fragment in a transfer sequence, by indicating to the node, in a CTS message for example, which fragment is desired at each time. Also, the ACK command can indicate to the node that all of the fragments that the node has to send, as indicated by the RT2 command, have been successfully received. The other nodes in the LAN also receive the ACK message and thereby determine that they are permitted to resume normal operations. Managed DAT transmission thereby enables the base station to control the messaging in the LAN, without unnecessary delays, by actively specifying to the node which fragment to transmit at which time.

Figure 6C:
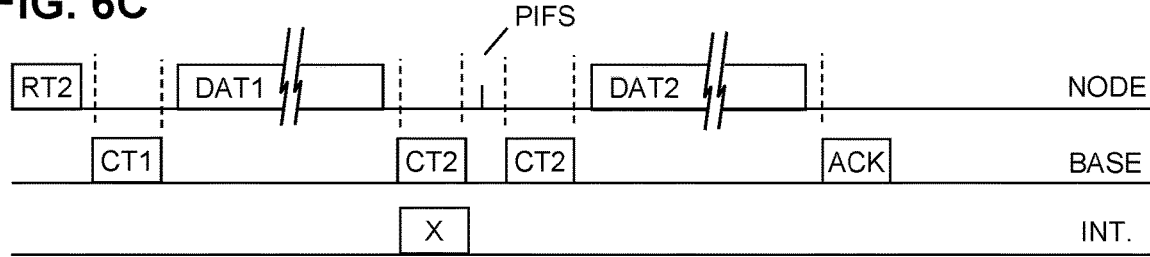
FIG. 6C is a sequence chart showing an exemplary transmission of two fragments including multiple prompting, according to some embodiments.

FIG. 6C is a sequence chart showing an exemplary series of message fragments including managed DAT transmission for mitigation of a collision with a CTS message, according to some embodiments. Here a node sends its RT2 message indicating that two fragments are available, and the base station calls for the first fragment with a CT1 command. The node sends it, and the base station responds with a CT2 command requesting the second fragment. However, the INT interference emits a signal X during the CT2 command, rendering the CT2 command unintelligible. The node, having failed to receive a usable CTS command, takes no action. In the mean time, the base station, which has no way of knowing that its CT2 command was corrupted, expects to receive the second fragment. The base station waits a SIFS as usual, and then listens to detect the beginning of the DAT2 message during a second SIFS interval, but it receives no DAT2 signal or even a carrier signal during the second SIFS interval, because the node is still waiting for instructions. The base station, failing to detect the requested fragment for two SIFS intervals, thereby determines that the CT2 message must have been somehow corrupted. The base station then retransmits the CT2 message. The two SIFS intervals may be equivalent to a single PIFS which is two slots in some embodiments. A single SIFS would be insufficient because the base station and the node normally remain silent for a SIFS between messages, so the base station cannot determine from a single SIFS interval that there was a problem. Therefore, the base station waits a second interval such as s second SIFS interval, which is needed for the base station to determine that the fragment is not forthcoming. Two SIFS are sufficient. Since this is still shorter than a DIFS, the other nodes are prevented from jumping in. Then the base station transmits the CT2 command, the node transmits DAT2, and the base station then acknowledges. In this way, the base station can recover from a command-interference event in which a CTS or other control command is corrupted, without causing the ready node to do a backoff or other delay. The triggering events in this example are the end of the first RTS command which triggers the first CT1 message, the end of the DAT1 which triggered the first CT2 command, and the end of the first CT2 command plus the PIFS listening interval which triggered the second CT2 command.

In some embodiments, the ready node may enter a backoff state (not shown) upon failing to receive the CT2 command due to interference. In that case, the second CT2 command may be received by the node, which terminates the backoff and transmits the DAT message as shown. Thus the backoff state is no impediment to the node resuming normal transmissions when instructed. The node monitors the channel to detect a late CTS command while in a backoff delay, and is prepared to abort the backoff when so commanded.

FIG. 7 is a flowchart showing an exemplary method for a base station to actively manage the transmission of DAT messages despite interference, according to some embodiments. Actions of a node are shown on the left, and actions of the base station on the right. Solid lines show the logic sequence, and dashed lines show message traversals. At 701, the node sends an RTS message that includes a fragment count (that is, the number of fragments to be transmitted) and then listens for a CTS reply. At 702 the base station receives the RTS and sends a CTS command that includes a fragment number of 1, which is an instruction to send the first fragment. At 703 the node determines whether it has received a CTS message within a listening interval. If the node does not get the CTS, it begins a backoff delay at 704. If the node receives the CTS, at 705 it sends the desired DAT message (DAT FRAG) which in this case is the first fragment, and then listens for an ACK or CTS reply.

At 706, the base station detects the DAT and determines whether it is collided. If the DAT is collided, the base station at 707 retransmits the CTS again, with the same fragment number specified, so that the node can retransmit the first fragment. If the DAT is not collided at 706, the base station then determines at 708 whether the received fragment is the last one, that is, whether the number of fragments received equals the number initially specified in the RTS message. If not, the base station then sends a CTS message at 709, specifying the next fragment. If all the fragments have been received at 708, the base station sends an ACK at 710, which the node receives at 711 and is done at 712. If the node fails to receive the ACK at 711, the node then determines whether it has received a CTS at 703 instead. If so, it sends the requested fragment. And if the node receives neither an ACK nor a CTS, due to an ongoing noise interference for example, the node enters a backoff at 704.

Although not shown in this chart, the base station can continue to actively manage the node while the node is in a backoff state. For example, if the node has entered a backoff state during an interrupted fragment sequence, due to a failure to receive an ACK or CTS when expected for example, the node may still be in a backoff state when the interference subsides and the base station is ready for the next fragment. In that case, the base station may draw the node out of the backoff delay by transmitting the expected CTS or ACK at that time. Since the CTS or ACK includes the address of the intended node, this message would not be interpreted as a command by any other node in the LAN. The node in backoff, on the other hand, would receive the delayed ACK or CTS, determine that the message is intended for that node according to the Receiver Address field of the CTS message, terminate the backoff state, and transmit the desired fragment (if a CTS), or (if an ACK) can simply record a successful termination of the message sequence and resume normal operations. In this way, the base station can actively manage node transmissions, including an interrupted fragment sequence and/or collisions, regardless of whether the node has entered a backoff state, and in addition can save time by allowing the backoff node to retransmit when instructed (or to resume normal activity if an ACK), without waiting for the backoff to expire.

The method thus enables the base station to control how and when a node transmits a DAT fragment, thereby avoiding delays and collisions. In addition, the base station can maintain exclusivity of the channel while messages are being exchanged, since nodes wishing to send an RTS are configured to wait at least one DIFS, while listening for interfering carrier signals, before transmitting its RTS message at 701. The base station sends its CTS reply at 702 after only one SIFS between the end of the RTS and the beginning of the CTS, and thereby prevents other nodes from transmitting. All the nodes in a LAN can detect the base station's transmission occurring during the DIFS interval, and hence would delay. In a similar fashion, the node waits only one SIFS at 705 before sending the DAT fragment, thereby preempting any other nodes that may wish to send an RTS. The transmitting node is permitted to transmit after waiting just a short SIFS instead of a long DIFS because the node has received a CTS command to do so.

As mentioned, the base station may detect an ongoing interference and, when it ends, may then provide a CTS to the node. The node may already be in a backoff state due to failure to receive the CTS when expected. The late CTS may thereby prompt the node to abort the backoff and transmit a message as specified in the CTS message. An advantage of the base station providing a delayed CTS after the interference has stopped, may be that the node may then save time by avoiding an unnecessarily long backoff delay. Another advantage may be that the base station may maintain direct control over the message flow, despite interference and other unknowns, by prompting the DAT fragment transmission or retransmission as soon as the channel is clear, thereby enhancing the message success rate and throughput.

Figure 8A:
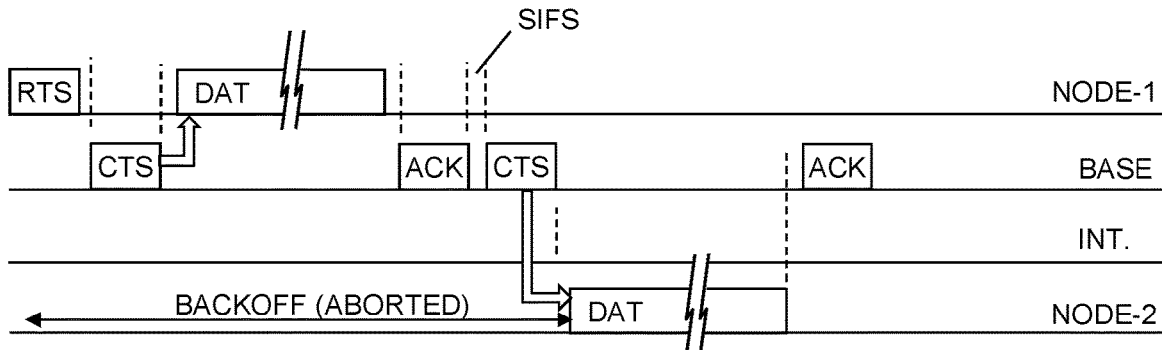
FIG. 8A is a sequence chart showing how an exemplary base station can prompt a node to send a DAT message following an ACK, according to some embodiments.

FIG. 8A is a sequence chart showing how an exemplary base station can direct two nodes to send their messages with minimal delays, according to some embodiments. The activities of two nodes, Node-1 and Node-2, are shown along with a base station, plus an INT line which is idle in this case. Both Node-1 and Node-2 have messages to send, but Node-2 is initially in a backoff state. Since the channel is clear, Node-1 sends an RTS. The base station replies with a CTS which is specifically addressed to Node-1, as indicated by a fat arrow. Node-1 accordingly sends its DAT message and receives an ACK reply. Then, after only a SIFS space (or optionally a two-slot PIFS space), the base station sends another CTS, this time addressed to Node-2 as indicated by another fat arrow. That causes Node-2 to abort its backoff delay and immediately (after a SIFS) transmit its DAT, for which it receives an ACK, and all is done. The example shows that the base station can actively manage the channel to efficiently allow two waiting nodes to transmit with minimal delays, by providing a second CTS to the second node shortly after completing the ACK to the first node, thereby preempting any other nodes that may wish to transmit. The first triggering event is the end of the RTS message, and the second triggering event is the end of the first ACK message, each of which leads to an immediate CTS calling for the next DAT message respectively.

Figure 8B:
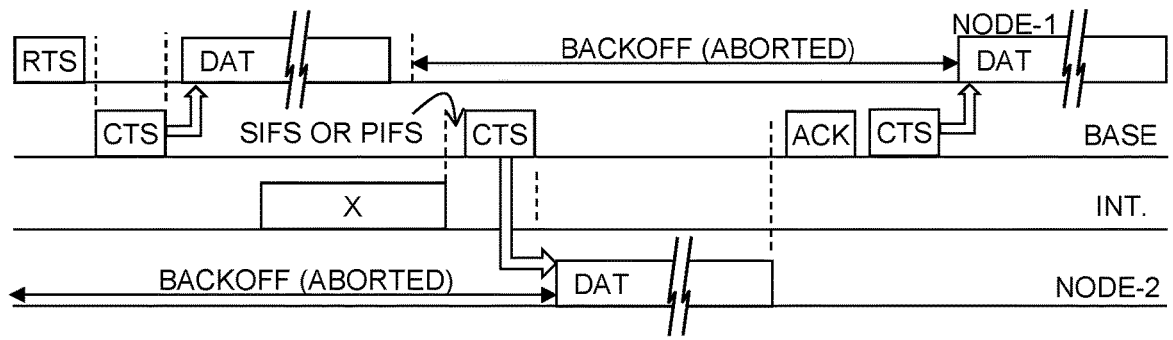
FIG. 8B is a sequence chart showing how an exemplary base station can prompt a node to send a DAT message following interference, according to some embodiments.

FIG. 8B is a sequence chart showing an exemplary sequence of messages including a managed DAT transmission to permit a delayed node to transmit its DAT message before other nodes that have not been delayed, according to some embodiments. The example also shows how the base station can allow a high-priority message to be transmitted ahead of a low-priority message. The example also shows how the base station can maintain control of the channel, despite interference, until all of the waiting nodes have been served in a sequence determined by the base station.

The chart shows activities of two nodes, Node-1 and Node-2, in a LAN, along with base station messages and an INT noise source. Both nodes have messages to send, but Node-2 is in a backoff state. Node-1 sends its RTS and gets a CTS, which enables Node-1 to transmit its DAT. Interference X occurs while that DAT is in progress, and also extends beyond the DAT. The base station, detecting the end of the interference, then resumes control by sending a CTS after only a short SIFS space, thereby blocking any other nodes from transmitting. However, this second CTS is addressed specifically to Node-2, not to Node-1, because the base station has determined that Node-2 has waited longer than Node-1 for a chance to transmit. Therefore the base station now sends the second CTS specifically to Node-2, as indicated by the second fat arrow. Node-1, failing to get a suitable ACK or CTS, then enters a backoff state.

Node-2, receiving the second CTS, then sends its DAT message as instructed, and the base station replies with an ACK. After the ACK plus a short SIFS space, the base station then sends a third CTS which is addressed to Node-1, which is still in backoff. This third CTS enables Node-1 to abort its backoff and send its DAT message again. In this way, the base station may grant access to each node according to its accumulated delay time or number of backoff delays, or the highest priority, or other criterion. By following each successful ACK promptly by another CTS, directed to a different node, the base station can cycle through the waiting nodes in a proper sequence according to a parameter such as number of delays, until all the waiting nodes have been served.

The example also illustrates three different types of triggering events. The first CTS was triggered by the RTS message as usual. The second triggering event was the end of the interference, which triggered a CTS to a different node in this case. The third triggering event was the end of the ACK to Node-2, after which the base station send a CTS back to Node-1. In this way the base station, responding to each triggering event with a selectively directed CTS, can manage the LAN messaging to provide transmission opportunities to the most-delayed or highest-priority nodes in an orderly way.

The base station may determine which node is the most-delayed (or highest-priority, etc.) node by any suitable means. For example, the base station may prepare a table of values, or equivalent, in non-transient memory with each node in the LAN being associated with one of the entries, respectively. For example, each table value may be a count of the number of delays that each respective node has accumulated since the last successful completion (or ACK receipt) by each of the nodes. The base station can increment each node's corresponding count upon sending that node a CTS, and can re-zero the node's corresponding count upon sending that node an ACK indicating that the node has successfully completed a DAT transmission. The base station can then transmit a CTS message to a selected node that corresponds to the largest table value. Responsive to a triggering event, the base station can select a node according to the largest delay count or longest time spent in delay or longest chronological time spent waiting, or other criterion, thereby prompting the selected node to transmit its DAT. An advantage of this method, for determining which node to serve next, may be that it does not require the nodes to include delay data in their RTS messages, since the base station determines the table of values and selects the winner without input from the nodes. Hence, the method can be practiced with legacy nodes in the LAN that do not report their delay numbers, for example.

As an alternative, the base station may determine which node is most-delayed or highest-priority according to a delay value (or priority or other value) provided by each node in its RTS message. Each node may indicate in its RTS message a number indicating how many times that node has entered a backoff state since it last received an ACK, or how many total slots it has waited, or other measure of delay, or a priority value, or other value that the base station can use to select which node to serve. An advantage of this method for determining which node to serve, may be that the node-reported delay value is expected to be accurate since the node knows how many times it has entered backoff since the last ACK was received. Another advantage may be that nodes with high-priority or emergency messages may be advanced ahead of other less-urgent nodes.

Figure 8C:
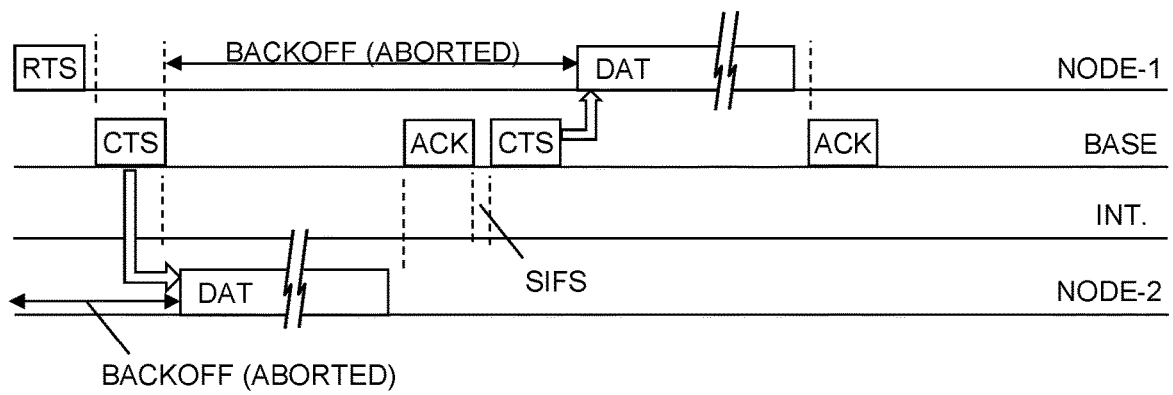
FIG. 8C is a sequence chart showing how an exemplary base station can select which node may send a DAT message, according to some embodiments.

FIG. 8C is a sequence chart showing an exemplary series of messages including a managed DAT transmission to enable a most-delayed node to transmit its DAT message, according to some embodiments. Node-1 transmits an RTS while Node-2 is in a backoff state. However, Node-2 has had more delays (or more delay time or higher priority or other parameter) than Node-1. Therefore, the base station sends a CTS message, not to Node-1, but rather to Node-2 which is still in backoff. Node-2 receives the CTS, which causes Node-2 to abort its backoff delay and immediately send its DAT message. The base station responds by sending an ACK to Node-2 and then, after one (or possibly two) SIFS, the base station sends a CTS addressed to Node-1. Node-1, which has entered a backoff delay in the meantime, then receives the second CTS, aborts its backoff, transmits its DAT, then gets an ACK, and is done. The example shows how the base station can accelerate a node that has more accumulated delays (or more time in backoff delay or a higher priority) over another node with less delay or priority, by sending a CTS addressed the the most-delayed (or higher-priority) node. The example also demonstrates sending a CTS to a selected node responsive to an RTS, wherein the selected node is different from the one sending the RTS. The example also demonstrates two types of triggering events, the first being the end of the Node-1 RTS message and the other being the end of the ACK message to Node-2. The example also shows how the base station can cycle through the waiting nodes by sending a respective CTS to each node, allowing each node to transmit in proper sequence. In addition, the base station maintains control of the LAN by transmitting each CTS only one or two slots (less than a DIFS) after each ACK, which prevents other nodes from causing a collision.

Figure 9:
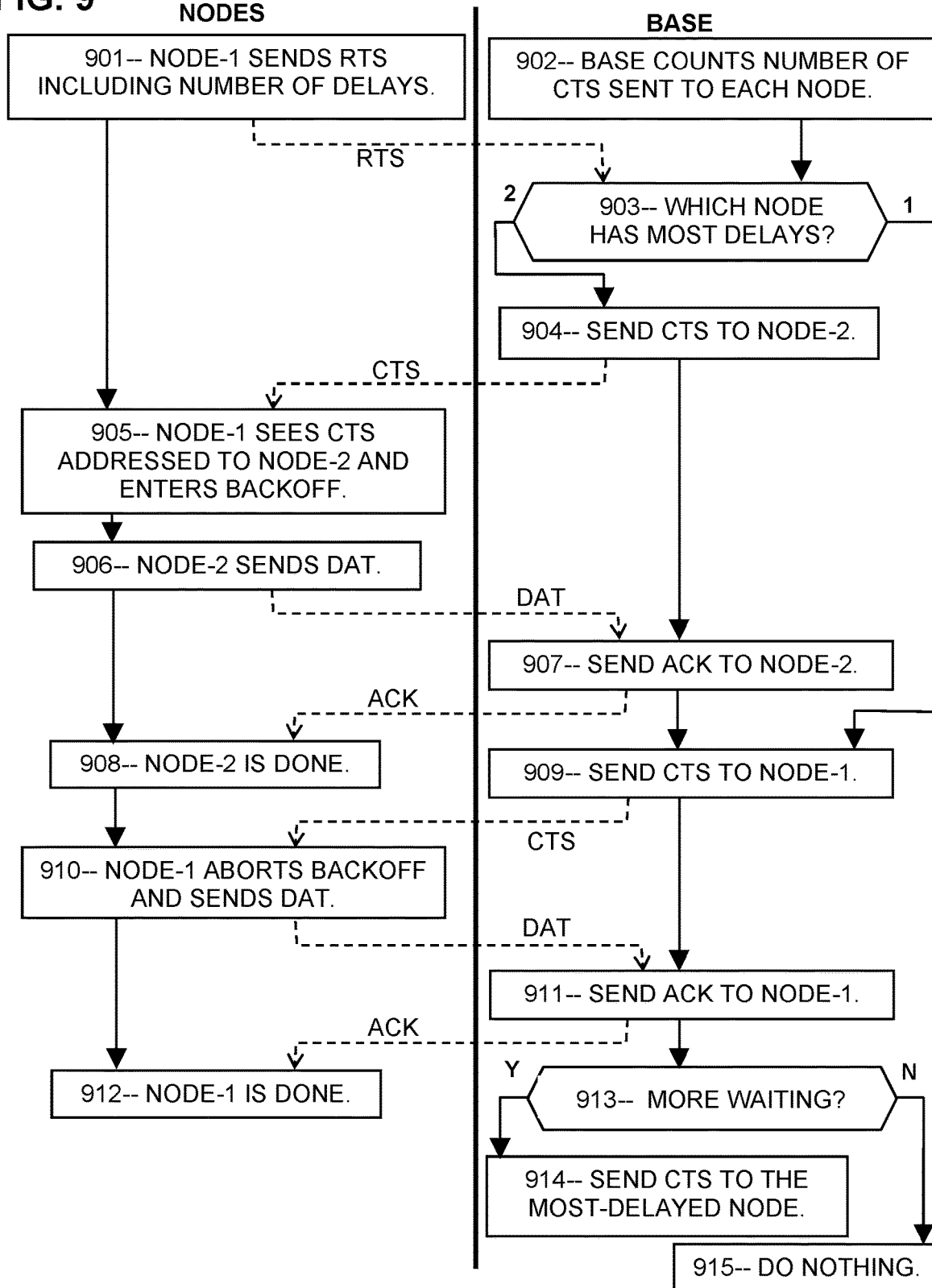
FIG. 9 is a flowchart showing an exemplary method for a base station to allow the most-delayed node to transmit a message, according to some embodiments.

FIG. 9 is a flowchart showing an exemplary method for a base station to actively manage the DAT transmissions of multiple nodes, giving priority to the longest-delayed node, according to some embodiments. Actions of the nodes (Node-1 and Node-2) are on the left and actions of the base station are on the right. Messages are shown in dash going between the left and right sides. Two versions are shown, one in which the nodes include an indication, in their RTS messages, of how many delays they have had since their last successful completion, and in the other version the base station estimates the delay count for each node by counting the number of CTS messages that the base station has sent to each node since the last ACK was sent. Artisans may find other ways of estimating node delay counts and other ways of assigning priority values.

In the first version, the nodes keep track of their delay numbers and indicate the count in each RTS message that they send. In the second version, the base station keeps track of the number of CTS messages it has sent to each node, resetting the count to zero upon sending an ACK message to that node. The first version (nodes count delays) may have an advantage of being accurate, since the nodes know how many times they have entered backoff. The second version (base station keeps track) may have an advantage that any nodes that are not configured to report their delay numbers can still be accommodated according to the number of CTS attempts for each node. In either version, the base station keeps, in non-transient memory for example, a table (or equivalent) of the delay numbers or delay times associated with each node respectively, so that the most-delayed node can be identified and served before the others. The delay values could alternatively be the chronological time for each node, equal to the time elapsed from the sending of the initial RTS to the base station, and resetting the time to zero after each completion. Alternatively, the table and selection criteria could be based on another parameter such as the priority or QoS or other information about each node. For example, a smart sensor that measures a slow-changing value such as a room temperature may be safely delayed many times without serious consequences, whereas a voice-encoded wireless message would result in garbled speech transmission if delayed more than once. Alternatively, priority may be given to shorter DAT messages or non-fragmented DAT messages, relative to longer or fragmented DAT messages, since a plurality of the shorter messages may be transmitted in less time than one of the longer multi-fragment messages. If a node has a critical message such as an emergency or 911 call, then it may indicate that in its RTS and receive channel access immediately.

In the figure, at 901, Node-1 sends an RTS message which includes, in the message, a number indicating how many times Node-1 has performed a backoff delay, for example by counting its backoff delays since its last successful completion. A successful completion may be recognized when the node receives an ACK message, at which time the delay counter for that node is reset to zero. Previously (not shown), Node-2 has sent another RTS indicating its number of delays, which may be higher or lower than the number of delays of Node-1. The base station will decide when each node can transmit, based on the larger number of delays.

The other version of determining the delay for each node is shown at 902, in which the base station calculates the "oldest" (that is, most-delayed) node according to the number of CTS messages sent by the base station to each node, and again resetting the count to zero upon sending each node an ACK.

In either version, the flow proceeds to 903 where the base station determines which node has the most delays (or the most delay time, or the highest priority, etc.). If the most-delayed node is Node-2, the base station sends a CTS to Node-2 at 904. At 905, Node-1 detects the CTS addressed to Node-2 and thereby determines that its RTS was rejected or collided or otherwise not accepted, and enters a backoff delay. At about the same time, Node-2 detects that the CTS was addressed to it and sends a DAT message to the base station at 906. The base station receives the DAT from Node-2 at 907 and sends an ACK message addressed to Node-2. Node-2 receives the ACK at 908 and is done.

Then, at 909, the base station sends a CTS to Node-1. Node-1 receives the ACK at 910, aborts its backoff delay, and sends its DAT message, which the base station receives at 911 and replies with an ACK. Node-1 receives the ACK at 912 and is done. The base station then, at 913, determines if more nodes are waiting (that is, if other nodes are currently in a backoff delay, as indicated by nodes having sent an RTS and not yet received an ACK). If there are further delayed nodes, the base station selects one of them according to the most-delayed (or other criterion) and sends the selected node a CTS at 914. If no other nodes are waiting, at 915 the base station does nothing (or begins listening for another RTS message) and the LAN returns to normal contention-based communication.

A similar scenario transpires if Node-1 has the most delays, but with Node-1 and Node-2 reversed. At 903, the base station determines that Node-1 is the most-delayed, and sends a CTS to Node-1 at 909. Node-1 sends its DAT at 910 and gets an ACK at 911-912 as before. Likewise any other delayed nodes in the LAN may be served in a similar manner, according to the most delayed (or highest priority, etc.).

Figure 10A:
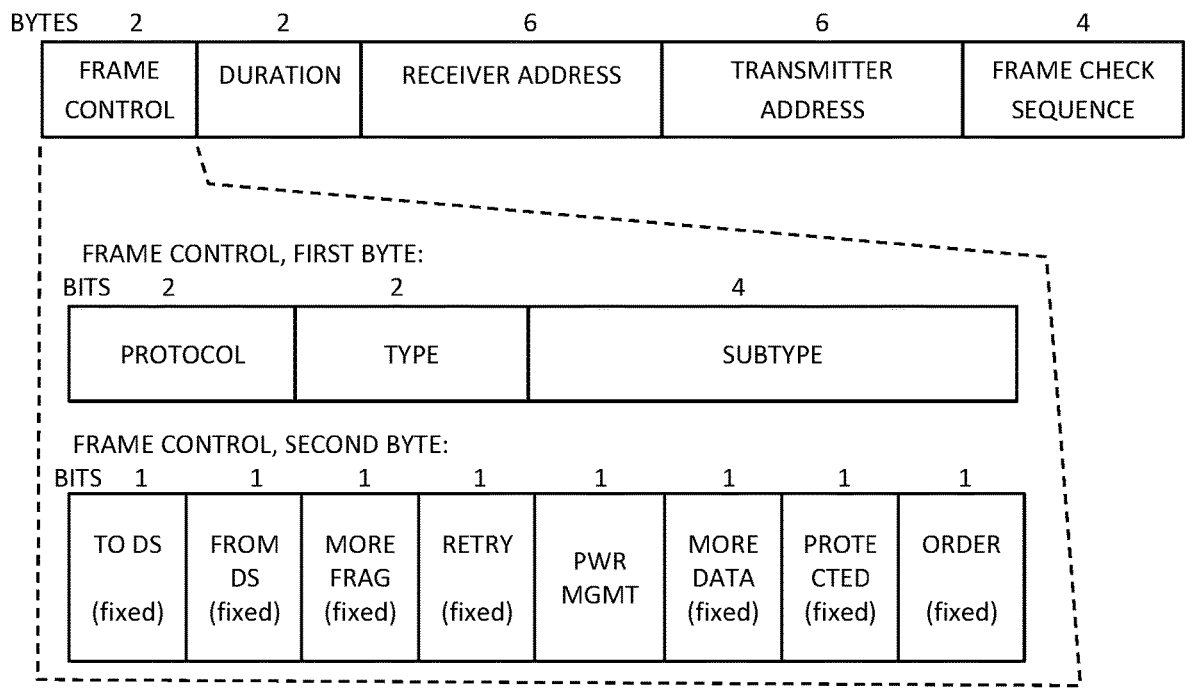
FIG. 10A is a schematic showing the fields of an RTS message and the bit assignments of a Frame Control field, according to prior art.

FIG. 10A is a schematic showing the fields of an RTS message according to prior art. The fields of an RTS message are depicted as a Frame Control field, a Duration field, a Receiver Address, a Transmitter Address, and a Frame Check Sequence. The Duration field indicates how long the transmitting node expects its DAT (plus optionally a CTS and/or an ACK) will take. The Receiver Address is the MAC address of the base station. The Transmitter Address is the MAC address of the node. The Frame Check Sequence is an error-detection code based on the bits of the message. The number of bytes in each field is also shown. Not shown is a Preamble and Start Frame Delimiter which the transmitter generally prepends to each message to facilitate receiver timebase alignment and the like.

The Frame Control field is a two-byte field in which the first byte is shown as a Protocol code, a Type code, and a Subtype code, which together specify that this message is an RTS and is compliant with a version or standard, such as an IEEE 802.11 standard. The second byte of the Frame Control is shown as a series of eight 1-bit flags which, for an RTS, are necessarily zero (as indicated by a "fixed" indicator), except for the Power Management flag which may vary.

Figure 10B:
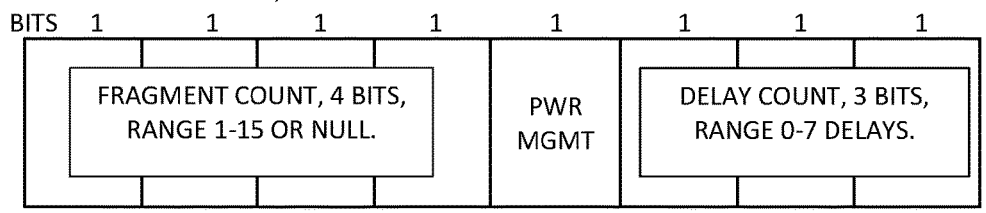
FIG. 10B is a schematic showing exemplary bit assignments of an RTS Frame Control byte including Delay Count and Fragment Count, according to some embodiments.

FIG. 10B is a schematic showing how an exemplary RTS can be used to indicate the node delay count and/or the number of fragments to be sent, according to some embodiments. Since at least seven of the bits in the second byte of the prior-art Frame Control field are not used in an RTS, it may make sense to reprogram those bits for other purposes, such as indicating the number of delays that the transmitting node has experienced, and/or the number of fragments that the node wishes to send. In the depicted example, the first four bits have been reprogrammed to hold the delay count in binary, ranging from zero to 15. A zero count means that the instant RTS message has not yet been delayed at all. A count of 15 may indicate that the node has been delayed 15 or more times. Alternatively, the 15 count may be reserved for special use such as emergency requests.

The Number of Fragment count may be indicated in the last three bits, ranging from zero to seven. A value of one may indicate that the node has a single unfragmented DAT message to send, whereas seven may indicate seven (or more) fragments to send. The null value may indicate that the node is not configured for fragment management by this means, or may indicate some other problem.

Alternatively, the first four bits may represent the number of fragments in which "1111" means 15 or more fragments, and the last three bits may represent the number of delays in which "111" means 7 or more delays. Since in some protocols a DAT that has been delayed 10 times is considered to have failed and is dropped, it may not be necessary to have a delay indicator that reaches 15. The base station may be configured to give any node that asserts a delay count of 7 the next available transmission opportunity, to avoid a dropped message. As a further alternative, the Power Management flag may be reprogrammed as part of the delay count or the fragment count, for increased range. If even further range is needed for the Delay Count or the Fragment Count, all seven available bits may be used for a single value that ranges zero to 127.

Other examples described above may employ this scheme of encoding the delay count and/or the fragment count in unused bits of an RTS message. Referring to the example of FIG. 6A, the RT2 message in that figure may be a standard RTS but with the first four bits of the second Frame Control byte being "0010" which is two in binary, thereby indicating that the node has two fragments to send.

As a further example, referring to FIG. 9, the last three bits of the second byte in the RTS of Node-1 in that example may be "011" which is three in binary, indicating that Node-1 has had three delays so far. Likewise the last three bits in an RTS from Node-2 (not shown) may be "101" which is five in binary, indicating that Node-2 has had five delays. Thus the base station may record those values in a memory table, and by comparing the values, may determine that Node-2 has more accumulated delays than Node-1. Accordingly, the base station may send a CTS message to Node-2, thereby enabling Node-2 to transmit.

Figure 10C:
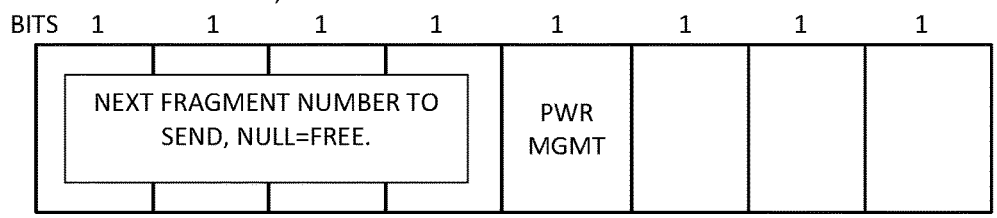
FIG. 10C is a schematic showing exemplary bit assignments of a CTS Frame Control byte including Next Fragment Number, according to some embodiments.

FIG. 10C is an exemplary schematic of a CTS message that specifies which fragment a node is to transmit, according to some embodiments. The fields of a CTS are similar to those of an RTS. The first four bits of the second Frame Control byte of a CTS may be reprogrammed to indicate which fragment the node is to send. For example, up to 15 fragments may be specified by the code, while a zero code may indicate that the node is not using this fragment-counting method at all, or other interpretation depending on the protocol. Referring to the example of FIG. 6A, the CT1 message may have the binary code "0001" in the first four bits of the second Frame Control byte, while the CT2 message may have "0010", or two in binary, to indicate that the second fragment is desired. By repurposing some of the unused bits in the CTS message, the base station can instruct the node as to which fragment the node should transmit.

Figure 11A:
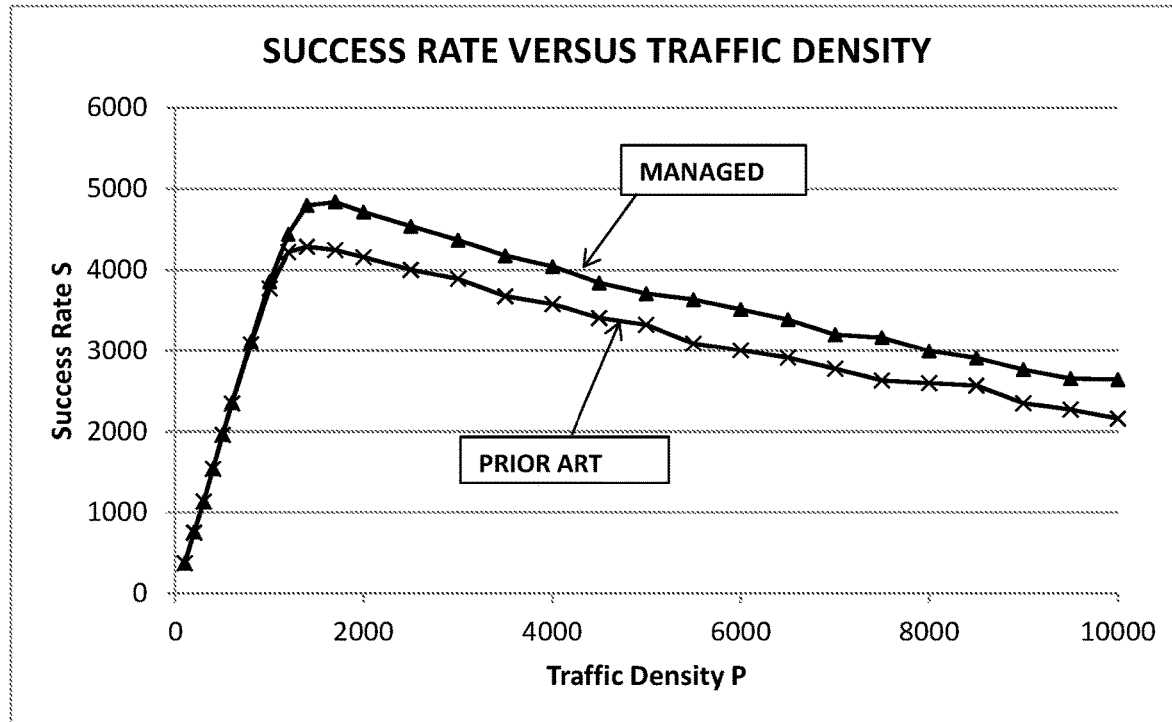
FIG. 11A is a chart showing success rates for a simulation of an exemplary LAN with and without managed DAT transmission, according to some embodiments.

FIG. 11A is a chart showing results of an exemplary network simulation, showing the message success rate S versus the traffic density P for a LAN with managed DAT transmission, according to some embodiments. The chart shows the success rate S for message completions with managed DAT transmission as disclosed herein ("Managed", triangle markers) and prior art without managed DAT transmission ("Prior Art", X markers). All conditions were the same for the Managed and Prior Art runs except in the Managed case the base station was configured to send a CTS to the most-delayed node upon each triggering event, and in the Prior Art runs the base station only responded to RTS messages as they occurred, without considering the delay count.

The success rate S is the number of RTS-CTS-DAT-ACK completions per million slots, and the traffic density P is 10 million times the probability that a particular node will transmit an RTS message in a particular time slot. The number of nodes in the simulated LAN was 40, each slot was six bytes long, the length of RTS, CTS, and ACK messages was 5 slots, and the length of a DAT message was 167 slots or 1 k bytes. In addition, three external noise sources transmitted interfering DAT messages at random intervals, with the same transmission probability P as the LAN nodes. Collisions, or attempts to transmit while another node is active, caused both of the colliding nodes to begin backoff delays. The backoff protocol was the common "binary exponential backoff" delay protocol in which the length of a backoff delay is equal to one DIFS plus a randomly selected portion of a contention window, and the contention window is doubled upon each successive delay. The starting or initial contention window size was 32 slots in the simulation, and the maximum contention window size was 1000 slots. The same backoff protocol was used for both the Managed cases and the Prior Art cases.

The model was run for 1 million slots at each of the P traffic density values indicated by marker symbols on each curve. The maximum success rate was observed in the range of P=1500-2000. At higher P values, the interfering nodes generated increasing numbers of collisions, which suppressed the success rate at the highest traffic densities. Importantly, the Managed success rate was consistently 10-12% higher than the Prior Art success rate, throughout the traffic range of P=1400-10000. The increased success rate of the Managed events may be due to the reduced delays, such as when a node in backoff was prompted by the base station to abort the backoff and transmit its DAT message immediately, thereby reducing wasted channel time. This indicates that a LAN using managed DAT transmission, according to the systems and methods disclosed herein, may achieve substantially higher throughput, according to some embodiments.

Figure 11B:
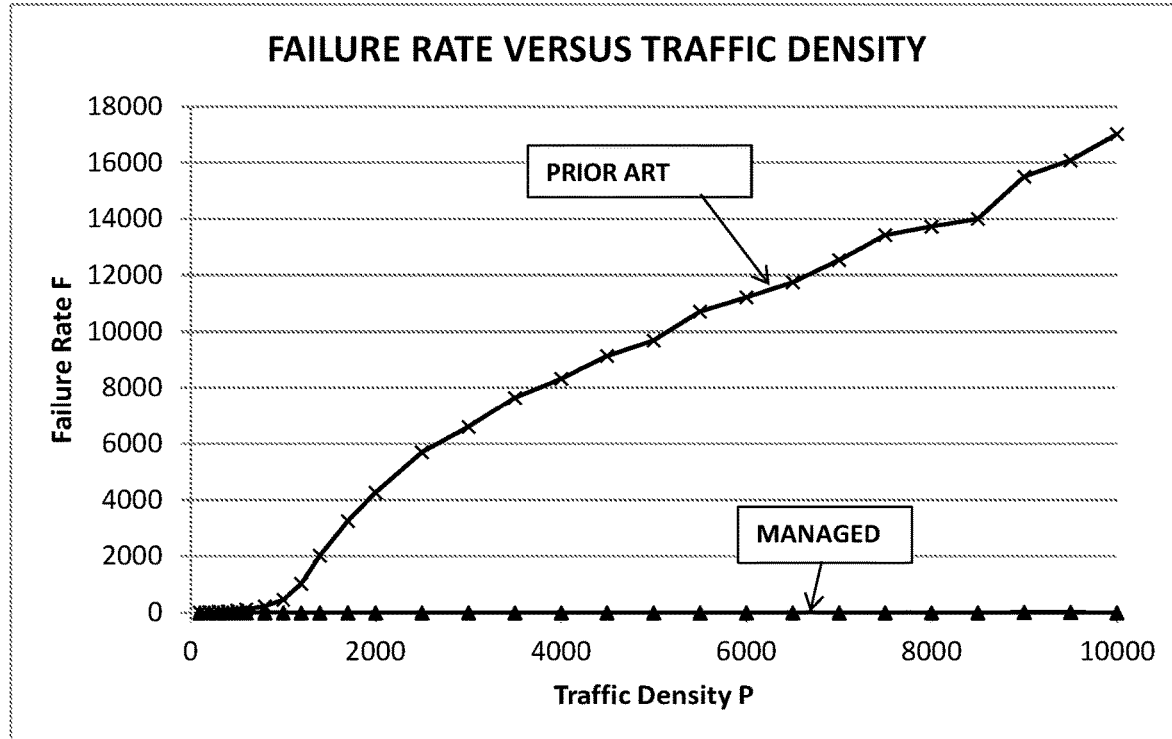
FIG. 11B is a chart showing failure rates for a simulation of an exemplary LAN with and without managed DAT transmission, according to some embodiments.

FIG. 11B is a chart showing results of the exemplary LAN simulation of FIG. 11A, now showing the message failure rate F versus traffic density with Managed and Prior Art transmission protocols, according to some embodiments. In the model, a message is counted as a failure if the node is forced into backoff delay ten times, at which point the message is dropped. The failure rate of the Prior Art cases climbs to 17,000 per million slots at high traffic density, due to the large number of instances in which a node is unable to complete its DAT transmission within ten tries. Message failures are a problem because they represent dropped messages. In addition, if the dropped message is sufficiently important, the node may start over with a new RTS and try again to send the DAT, further clogging the limited channel bandwidth (the simulation did not include such dropped and restarted messages). The observed failures in the Prior Art runs were due to competition with the other nodes of the LAN, as well as increasing external interference proportional to P.

In stark contrast, the failure rate for the Managed condition was nearly zero throughout the entire traffic density range. The reason that the failure rate was nearly zero for the Managed case was that the base station repeatedly selected whichever node had the largest number of delays, and prompted that node to transmit immediately. As a result, almost all nodes were able to successfully transmit their DAT messages before the ten-tries limit was reached. The Prior Art condition had no such advantage, and indeed gave a competitive disadvantage to the nodes that had waited the longest because they had the longest CW width, according to the binary exponential backoff protocol. The huge difference between the Managed and Prior Art failure rates clearly indicates that a LAN that includes managed DAT transmission according to the systems and methods disclosed herein may achieve substantially lower failure rates, according to some embodiments.

Figure 11C:
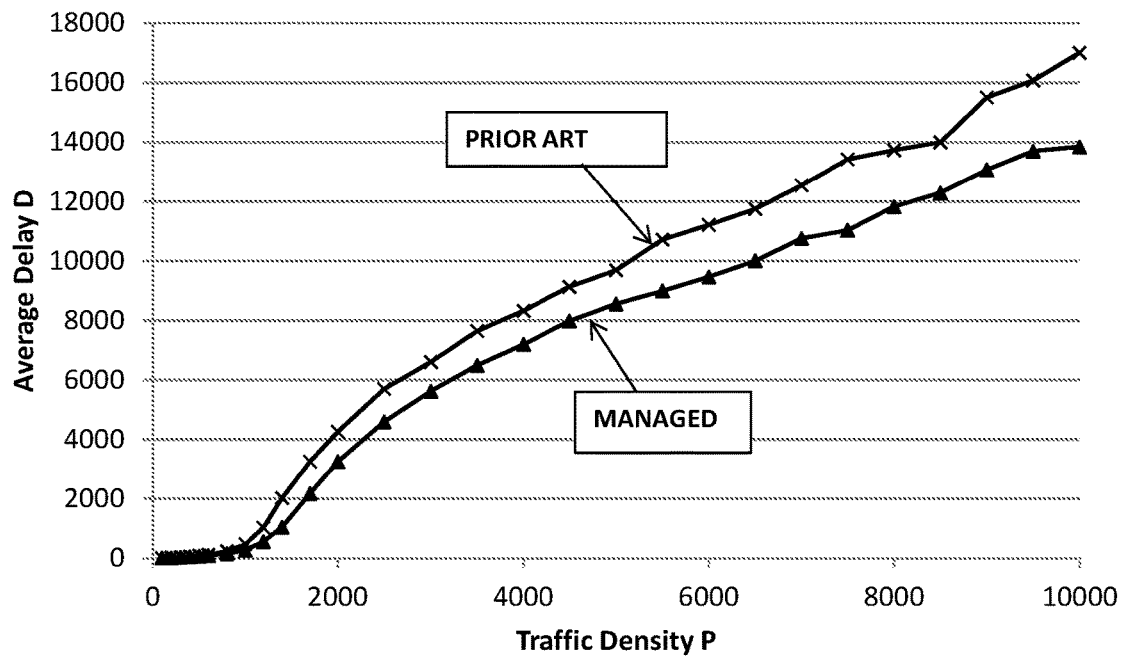
FIG. 11C is a chart showing average delay times for a simulation of an exemplary LAN with and without managed DAT transmission, according to some embodiments.

FIG. 11C is a chart showing results of the exemplary LAN simulation of FIG. 11A, now showing the average delay time D for each message completion, according to some embodiments. The average message delay time D was plotted versus traffic density with Managed and Prior Art transmission as labeled. The average delay time D was calculated as the total backoff slots of all the nodes, divided by the success rate of all the nodes, for a run of one million slots at each of the indicated traffic density values. The curves indicate how much delay each of the users may expect in communications in the LAN. The average delay time increased as the traffic density increased, due in part to competition between nodes and in part to the effect of the interfering external noise. However, the Managed case had about 15% lower delays than the Prior Art case, throughout the range of P=1000 to the maximum. The lower delay count for Managed messages was due primarily to the base station allowing nodes to abort their backoff delays when the channel is clear, which reduces the amount of unnecessary delay time. The result indicates that a LAN that includes managed DAT transmission, according to the systems and methods disclosed herein, may achieve substantially lower message delays, according to some embodiments.

Figure 11D:
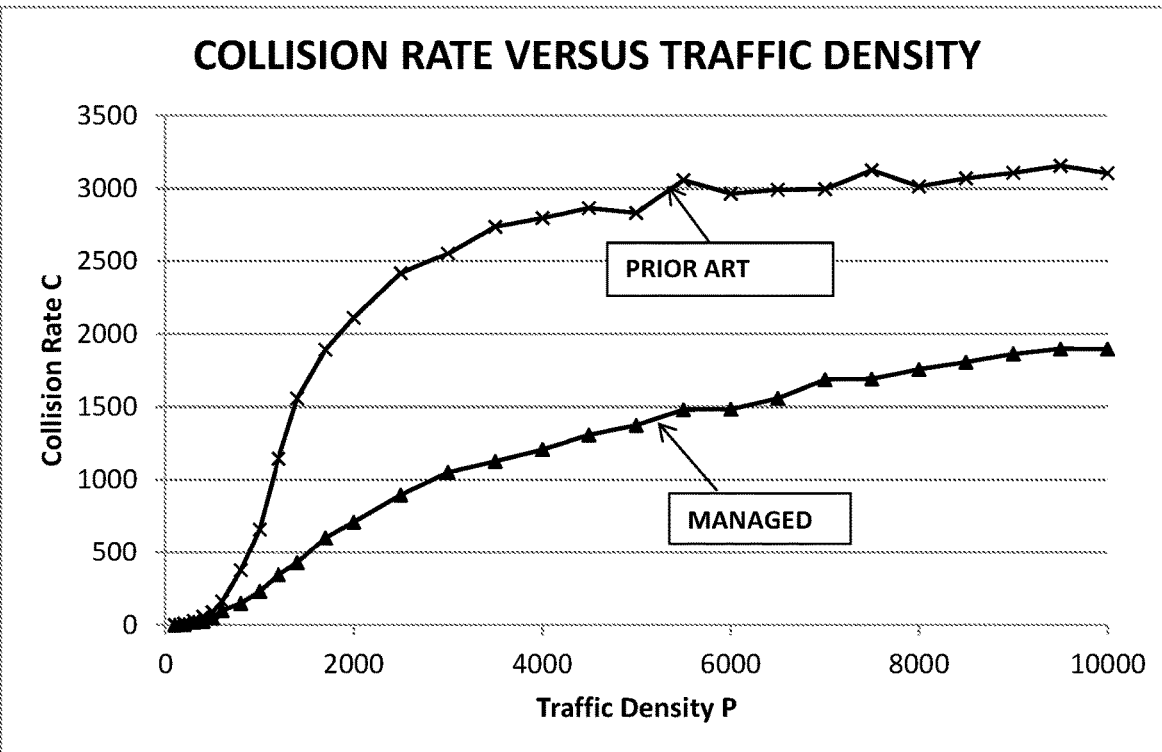
FIG. 11D is a chart showing collision rates for a simulation of an exemplary LAN with and without managed DAT transmission, according to some embodiments.

FIG. 11D is a chart showing results of the exemplary LAN simulation of FIG. 11A, now showing the message collision rate C versus traffic density with Managed and Prior Art transmission, according to some embodiments. Message collisions were observed when two nodes initiated messages in the same slot, or when two nodes that are hidden from each other attempted to transmit overlapping messages, or whenever one of the external noise sources transmitted an interfering signal while any of the LAN nodes was transmitting. After each such transmission, the collided node or nodes entered a backoff delay before attempting another transmission. The collision rate was lower in the Managed case than in the Prior Art case, because with managed DAT transmission the base station prompted each waiting node to transmit its DAT while continuing to maintain a Reserve state, thereby reducing collisions between nodes of the LAN. This chart indicates that a LAN that includes managed DAT transmissions and Reserve states according to the systems and methods disclosed herein may achieve substantially lower collision rates, according to some embodiments.

Figure 12A:
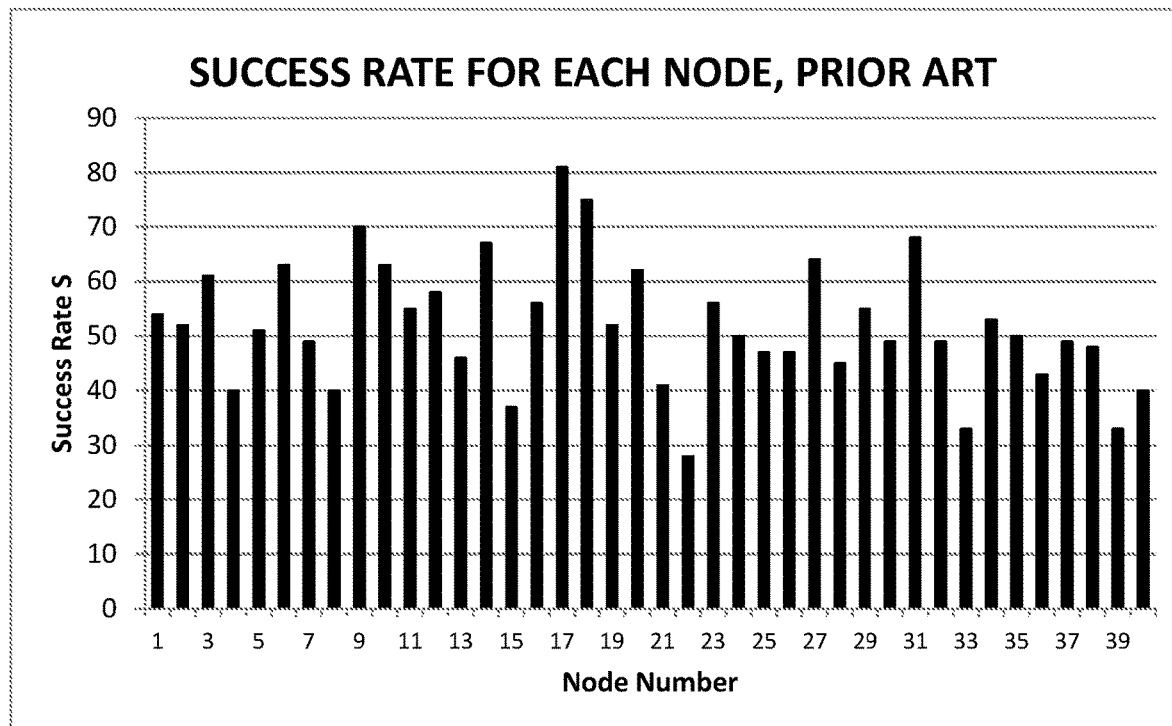
FIG. 12A is a chart showing the success rate for each node in a LAN, according to prior art.

FIG. 12A is a chart showing Prior Art results of the LAN simulation of FIG. 11A, showing the message success rate S(i) for each node i in the LAN individually, i being the node number which ranged from 1 to 40, there being 40 nodes in the simulated LAN. This data was measured using a traffic density of P=10000, the highest level of traffic density, and with the Prior Art (not managed) DAT transmission. The success rate of each node is shown as the number of message completions, each completion being an RTS-CTS-DAT-ACK sequence for each node, in 1 million slots. The success rate for each node is displayed according to node number of 1-40, one bar per node, thereby showing the success rates of all the nodes in the simulated LAN. The chart shows that the success rate varies wildly from node to node, some nodes having a high success rate while other equal-priority nodes had low success rates. This indicates that some nodes were permitted to transmit more than other nodes. High node-to-node nonuniformity, as demonstrated in this chart, is generally observed in backoff protocols that give a competitive advantage to the nodes with the least amount of delay, as does the binary exponential backoff protocol. Since the backoff protocol causes the contention window to increase upon each transmission attempt, a node that has already been delayed several times is at a large disadvantage relative to other nodes that have not been delayed at all. Consequently, some nodes are able to transmit their DAT messages many times while other nodes are held in a backoff state for prolonged periods, leading to the large disparity in success rate among the nodes as shown. This disparity is the "Blocked Node" problem, and is characteristic of delay protocols that increase the delay or contention window upon each successive backoff delay.

Figure 12B:
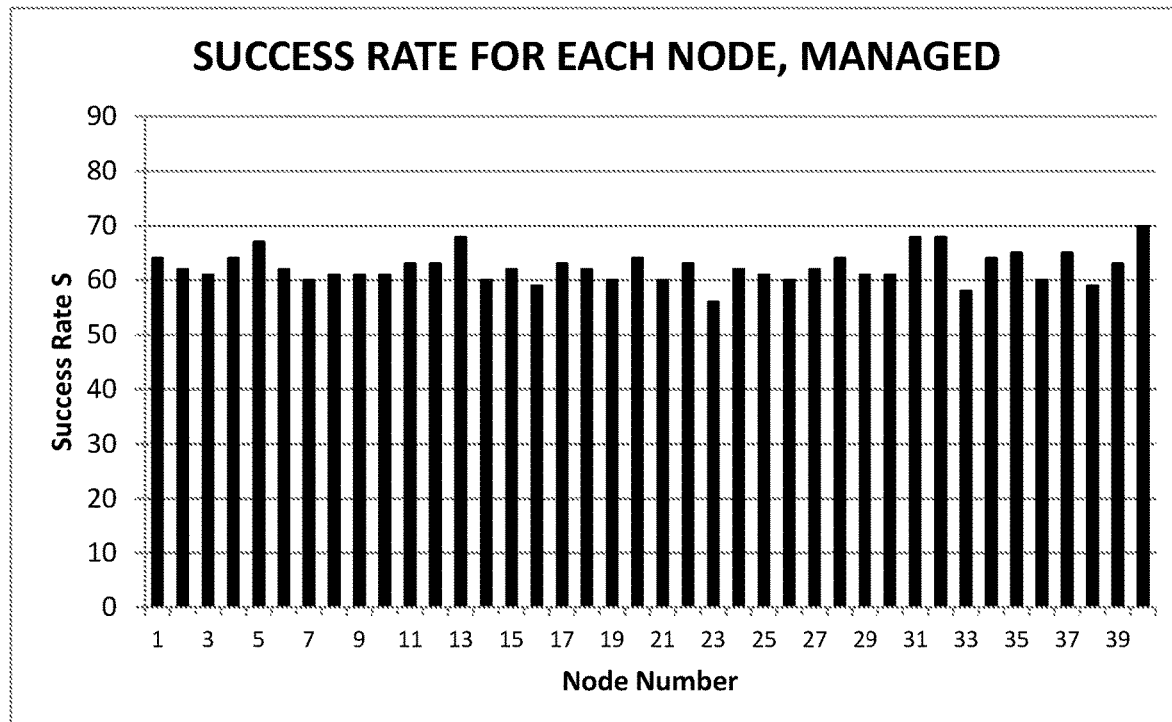
FIG. 12B is a chart showing the success rate for each node in an exemplary LAN including managed DAT transmission, according to some embodiments.

FIG. 12B is a chart showing results of the exemplary LAN simulation of FIG. 11A, now showing the message success rate S versus node number, with managed DAT transmission, according to some embodiments. The conditions were identical to those of FIG. 12A, including the binary exponential backoff protocol, but now the DAT transmissions were prompted by the base station according to the most-delayed node. As a consequence, the disparities of FIG. 12A were eliminated, and all the nodes received about the same number of transmission opportunities and achieved about the same success rate. Also, the average success rate is about 15% higher than for the prior art case of FIG. 12A. This result indicates that a LAN that includes managed DAT transmissions, according to the systems and methods disclosed herein, may achieve substantially lower inequality in the success rates of the individual nodes, and may obtain effectively equal access to the shared channel, according to some embodiments.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

The systems and methods disclosed herein can provide numerous advantages not obtainable with prior-art wireless protocols. At medium and high traffic densities, embodiments of the systems and methods can increase throughput or success rates in the presence of random interference, and this advantage may be especially significant at high traffic density and high rates of interference. Protocols according to present principles can be beneficially employed in numerous applications, including but not limited to vehicles (e.g., roadway, airborne, waterborne, autonomous, semi-autonomous, human-driven, rental scooters, truck trackers, etc.), personal devices (e.g., mobile phones, health monitors, personal locators, pet locators, etc.), computers (e.g., tablet, laptop, desktop, server, embedded, single-chip, portable, fixed-site, etc.), interconnected devices (e.g., "smart" appliances and controls, entertainment devices, voice-activated assistants, home security systems, cameras, etc.), emergency call and response systems (e.g., 911 servers, law enforcement systems, fire response systems, health emergency systems, national defense systems, etc.), responsive monitors and alarms (e.g., intrusion monitors, fire or smoke alarms, weather and other environmental, highway traffic, pedestrian traffic, earthquake monitors, etc.), office communication applications (e.g., communication between computers, printers, scanners, phones, data storage devices, marketing and presentation display devices, and other wireless business devices), manufacturing (e.g., automated producton and machine tools, sorters and transporters with wireless control, packaging and weighing and shipping stations that track individual orders, quality control sensors and connected servers, assembly robots, testing robots, product singulators and counters, packagers, labelers, etc.) and innumerable other products that communicate using radio waves. The practicality and usefulness of embodiments according to present principles will become greatly augmented with the widespread adoption of 5G and subsequent wireless generations (such as 6G and following subsequent and future technologies). Protocols for mitigating collisions with minimal delay, such as the protocols disclosed herein, will be needed even more as congestion continues to rise in the limited bandwidth available.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A local area network (LAN) comprising:
a plurality of user nodes, each user node configured to perform steps of:
transmitting a request message requesting permission to transmit a data message that contains data, receiving a permission message granting permission to transmit the data message, transmitting the data message responsive, at least in part, to the permission message, and receiving an acknowledgment message indicating that the data message was received; and
a base station, configured to perform steps of:
receiving the request message, transmitting the permission message responsive, at least in part, to the request message, receiving the data message, and transmitting the acknowledgement message responsive to the data message;
determining a delay value for each user node, each delay value being related to how much delay each respective user node has accumulated after receiving an acknowledgement message;
selecting whichever user node has the largest delay value; and
transmitting a permission message to the selected user node, wherein the determining comprises:
counting how many times the base station has sent a permission message to each user node;
upon transmitting an acknowledgement message to each respective user node, resetting the count for that user node to a null value; and
selecting, as the selected user node, whichever user node has the largest count.

2. The LAN of claim 1, wherein the base station is further configured to transmit the permission message to the selected user node at a predetermined time following a triggering event, wherein the triggering event is in the list comprising:
an ending of a permission message;
an ending of a data message;
an ending of an acknowledgement message;
an ending of a beacon message;
an ending of a wireless message;
an ending of an interference;
and combinations thereof.

3. A local area network (LAN) comprising:
a plurality of user nodes, each user node configured to perform steps of:
transmitting a request message requesting permission to transmit a data message that contains data, receiving a permission message granting permission to transmit the data message, transmitting the data message responsive, at least in part, to the permission message, and receiving an acknowledgment message indicating that the data message was received; and
a base station, configured to perform steps of:
receiving the request message, transmitting the permission message responsive, at least in part, to the request message, receiving the data message, and transmitting the acknowledgement message responsive to the data message;
determining a delay value for each user node, each delay value being related to how much delay each respective user node has accumulated after receiving an acknowledgement message;
selecting whichever user node has the largest delay value; and
transmitting a permission message to the selected user node, wherein the determining comprises:
counting how many times the base station has received a request message from each user node;
upon transmitting an acknowledgement message to each respective user node, resetting the count for that user node to a null value; and
selecting, as the selected user node, whichever user node has the largest count.

4. A local area network (LAN) comprising:
a plurality of user nodes, each user node configured to perform steps of:
transmitting a request message requesting permission to transmit a data message that contains data, receiving a permission message granting permission to transmit the data message, transmitting the data message responsive, at least in part, to the permission message, and receiving an acknowledgment message indicating that the data message was received; and
a base station, configured to perform steps of:
receiving the request message, transmitting the permission message responsive, at least in part, to the request message, receiving the data message, and transmitting the acknowledgement message responsive to the data message;
determining a delay value for each user node, each delay value being related to how much delay each respective user node has accumulated after receiving an acknowledgement message;
selecting whichever user node has the largest delay value; and
transmitting a permission message to the selected user node, wherein the determining comprises:
associating, with each user node, a respective computer-readable memory element;
upon receiving a request message from a particular user node while a particular memory element associated with the particular user node is a null value, recording a time in the particular memory element;
upon transmitting an acknowledgement message to the particular user node, setting the particular memory element to the null value; and
selecting, as the selected user node, whichever user node is associated with the earliest time.

5. A local area network (LAN) comprising:
a plurality of user nodes, each user node configured to perform steps of:
transmitting a request message requesting permission to transmit a data message that contains data, receiving a permission message granting permission to transmit the data message, transmitting the data message responsive, at least in part, to the permission message, and receiving an acknowledgment message indicating that the data message was received; and
a base station, configured to perform steps of:
receiving the request message, transmitting the permission message responsive, at least in part, to the request message, receiving the data message, and transmitting the acknowledgement message responsive to the data message;

determining a delay value for each user node, each delay value being related to how much delay each respective user node has accumulated after receiving an acknowledgement message;

selecting whichever user node has the largest delay value; and transmitting a permission message to the selected user node, wherein the determining comprises:

reading, from a request message transmitted by a particular user node, a count indicating how many times the particular user node has attempted to transmit a request message;

storing the count in a particular memory element associated with the particular user node;

upon transmitting an acknowledgement message to the particular user node, storing a null value in the particular memory element; and selecting, as the selected user node, whichever user node is associated with the largest count.

6. A local area network (LAN) comprising:

a plurality of user nodes, each user node configured to perform steps of:

transmitting a request message requesting permission to transmit a data message that contains data, receiving a permission message granting permission to transmit the data message, transmitting the data message responsive, at least in part, to the permission message, and receiving an acknowledgment message indicating that the data message was received; and a base station, configured to perform steps of:

receiving the request message, transmitting the permission message responsive, at least in part, to the request message, receiving the data message, and transmitting the acknowledgement message responsive to the data message;

determining a delay value for each user node, each delay value being related to how much delay each respective user node has accumulated after receiving an acknowledgement message;

selecting whichever user node has the largest delay value; and transmitting a permission message to the selected user node, wherein the determining comprises:

storing, in non-transient memory, a table of delay values, each delay value indicating a delay related to a corresponding one of the user nodes respectively;

setting a particular delay value corresponding to a particular user node to a null value upon transmitting an acknowledgement message to the particular user node;

selecting a selected user node, of the plurality of user nodes, having the largest corresponding delay value in the table; and transmitting a permission message to the selected user node.

7. The LAN of claim 6, wherein the base station is further configured to perform incrementing the particular delay value upon transmitting each permission message to the particular user node.

8. The LAN of claim 6, wherein the base station is further configured to perform incrementing the particular delay value upon receiving each request message from the particular user node.

9. The LAN of claim 6, wherein the base station is further configured to perform setting the delay value to a time, upon receiving a request message from the particular user node, while the delay value is the null value.

10. The LAN of claim 6, wherein the base station is further configured to perform reading, from a request message transmitted by the particular user node, a count indicating how many times the particular user node has attempted to transmit request messages.

11. A local area network (LAN) comprising:

a plurality of user nodes, each user node configured to:

transmit a request message requesting permission to transmit a data message that contains data, receive a permission message granting permission to transmit the data message, transmit the data message responsive, at least in part, to the permission message, and receive an acknowledgment message indicating that the data message was receive; and a base station, configured to:

receive the request message, transmit the permission message responsive, at least in part, to the request message, receive the data message, and transmit the acknowledgement message responsive to the data message;

determine a delay value for each user node, each delay value being related to how much delay each respective user node has accumulated after receiving an acknowledgement message;

select whichever user node has the largest delay value; and transmit a permission message to the selected user node, wherein:

a particular user node, of the plurality of user nodes, is configured to indicate, in a request message, how many fragments the particular user node has to send;

the base station is configured to transmit a permission message, indicating a particular fragment, to the particular user node; and the particular user node is configured to transmit, responsive to the permission message, the indicated particular fragment.

12. The LAN of claim 11, wherein the base station is configured to determine whether the particular fragment has been received within a predetermined interval, and upon determining that the particular fragment was not received within the predetermined interval, to retransmit the permission message to the particular user node.

13. A local area network (LAN) comprising:

a plurality of user nodes, each user node configured to:

transmit a request message requesting permission to transmit a data message that contains data, receive a permission message granting permission to transmit the data message, transmit the data message responsive, at least in part, to the permission message, and receive an acknowledgment message indicating that the data message was receive; and a base station, configured to:

receive the request message, transmit the permission message responsive, at least in part, to the request message, receive the data message, and transmit the acknowledgement message responsive to the data message;

determine a delay value for each user node, each delay value being related to how much delay each respective user node has accumulated after receiving an acknowledgement message;

select whichever user node has the largest delay value; and transmit a permission message to the selected user node, wherein the base station is further configured to:
- select a particular user node, of the plurality of user nodes, and transmit a particular permission message to the particular user node;
- attempt to receive a particular data message from the particular user node responsive to the particular permission message;
- determine whether the particular data message is corrupted and whether interference is present after the particular data message;
- transmit, upon determining that the particular data message is not corrupted and that interference is not present after the particular data message, an acknowledgement message addressed to the particular user node;
- transmit, upon determining that the particular data message is corrupted and that interference is not present after the particular data message, a permission message addressed to the particular user node;
- transmit, upon determining that the particular data message is not corrupted and that interference is present after the particular data message, an acknowledgement message, addressed to the particular user node, after the interference has ended; and
- retransmit, upon determining that the particular data message is corrupted and that interference is present after the particular data message, the permission message addressed to the particular user node after the interference has ended.

14. A non-transitory computer-readable medium, operating on a base station in a local area network (LAN), the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgment message indicating that the data message was received;
- wherein the medium contains instructions for causing a processor in the base station to perform a method comprising:
- preparing, in non-transient memory, a table of values associated with each of the user nodes, respectively;
- decoding a request message, thereby determining a delay value and identifying information;
- recording, in the array or table, the delay value associated with a particular user node according to the identifying information so determined;
- determining a most-delayed value in the table, the most-delayed value being larger than any other value in the table;
- selecting a most-delayed user node that is associated with the most-delayed value; and
- transmitting the permission message to the most-delayed user node;
- wherein the delay value is at least one of:
  - a number of times that the selected user node has attempted to transmit a request message;
  - a number of backoff delays of the selected user node;
  - an amount of accumulated backoff time of the selected user node; and
  - an amount of chronological time of the selected user node waiting to transmit the data message, wherein the method further comprises:
- upon receiving a request message from a particular user node, incrementing a particular value associated with the particular user node; and
- upon receiving a data message from the particular user node, setting the particular value to a null value.

15. A non-transitory computer-readable medium, operating on a base station in a local area network (LAN), the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgment message indicating that the data message was received;
- wherein the medium contains instructions for causing a processor in the base station to perform a method comprising:
- preparing, in non-transient memory, a table of values associated with each of the user nodes, respectively;
- decoding a request message, thereby determining a delay value and identifying information;
- recording, in the array or table, the delay value associated with a particular user node according to the identifying information so determined;
- determining a most-delayed value in the table, the most-delayed value being larger than any other value in the table;
- selecting a most-delayed user node that is associated with the most-delayed value; and
- transmitting the permission message to the most-delayed user node;
- wherein the delay value is at least one of:
  - a number of times that the selected user node has attempted to transmit a request message;
  - a number of backoff delays of the selected user node;
  - an amount of accumulated backoff time of the selected user node; and
  - an amount of chronological time of the selected user node waiting to transmit the data message, wherein the method further comprises:
- upon receiving a request message from a particular user node while a particular value associated with the particular user node is equal to a null value, recording, in the table, a value indicating time and associated with the particular user node; and
- upon receiving a data message from the particular user node, setting the particular value to the null value.

16. A non-transitory computer-readable medium, operating on a base station in a wireless network, the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgement message indicating that the data message was received, the medium containing instructions for causing a processor in the base station to perform a method comprising:
- determining which particular user node, of the plurality of user nodes, has accumulated more delay than any other user node in the wireless network, and transmitting a permission message to the particular user node, wherein the determining comprises determining which user node, of the plurality of user nodes, has accumulated the largest number of backoff delays after receiving an acknowledgement message.

17. A non-transitory computer-readable medium, operating on a base station in a wireless network, the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgement message indicating that the data message was received, the medium containing instructions for causing a processor in the base station to perform a method comprising:

determining which particular user node, of the plurality of user nodes, has accumulated more delay than any other user node in the wireless network, and transmitting a permission message to the particular user node, wherein the determining comprises determining which user node, of the plurality of user nodes, has accumulated the largest amount of time in backoff delays after successfully transmitting a data message.

18. A non-transitory computer-readable medium, operating on a base station in a wireless network, the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgement message indicating that the data message was received, the medium containing instructions for causing a processor in the base station to perform a method comprising:

determining which particular user node, of the plurality of user nodes, has accumulated more delay than any other user node in the wireless network, and transmitting a permission message to the particular user node, wherein the determining comprises counting how many times the base station has sent a permission message to each respective user node after transmitting a latest acknowledgement message to that user node, and selecting, as the particular user node, whichever user node has the largest count.

19. A non-transitory computer-readable medium, operating on a base station in a wireless network, the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgement message indicating that the data message was received, the medium containing instructions for causing a processor in the base station to perform a method comprising:

determining which particular user node, of the plurality of user nodes, has accumulated more delay than any other user node in the wireless network, and transmitting a permission message to the particular user node, wherein the determining comprises counting how many times the base station has received a request message from each respective user node after receiving a data message from that user node, and selecting, as the particular user node, whichever user node has the largest count.

20. A non-transitory computer-readable medium, operating on a base station in a wireless network, the base station in signal communication with a plurality of user nodes, each user node configured to: transmit a request message requesting permission to transmit a data message that contains data, receive a permission message granting permission to transmit the data message, transmit the data message responsive to the permission message, and receive an acknowledgement message indicating that the data message was received, the medium containing instructions for causing a processor in the base station to perform a method comprising:

determining which particular user node, of the plurality of user nodes, has accumulated more delay than any other user node in the wireless network, and transmitting a permission message to the particular user node, wherein the method further comprises:

receiving, by the base station, a request message from a first user node;

determining, by the base station, that a second user node has accumulated more delay than the first user node; and transmitting, to the second user node, a permission message.

* * * * *